United States Patent
Ishibashi et al.

(10) Patent No.: US 7,818,110 B2
(45) Date of Patent: Oct. 19, 2010

(54) TRAVELING CONTROL DEVICE AND TRAVELING CONTROL PROGRAM FOR WORK VEHICLE OR CONTROL DEVICE AND CONTROL PROGRAM FOR WORK VEHICLE

(75) Inventors: Eiji Ishibashi, Komatsu (JP); Yoshitaka Onodera, Hiratsuka (JP); Hidehiro Hashimoto, Komatsu (JP); Yoshiyuki Hirosawa, Komatsu (JP); Toshihiko Fukasawa, Komatsu (JP); Yutaka Sugimoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 1058 days.

(21) Appl. No.: 10/594,279

(22) PCT Filed: Mar. 28, 2005

(86) PCT No.: PCT/JP2005/005726
§ 371 (c)(1),
(2), (4) Date: Sep. 26, 2006

(87) PCT Pub. No.: WO2005/092691
PCT Pub. Date: Oct. 6, 2005

(65) Prior Publication Data
US 2007/0198158 A1 Aug. 23, 2007

(30) Foreign Application Priority Data
Mar. 26, 2004 (JP) .............................. 2004-090709

(51) Int. Cl.
*B62D 61/00* (2006.01)
(52) U.S. Cl. .......................................... 701/50; 192/20

(58) Field of Classification Search ............. 701/50–55, 701/61, 62, 64; 477/34, 36, 20; 192/20, 192/147
See application file for complete search history.

(56) References Cited

U.S. PATENT DOCUMENTS
4,702,358 A 10/1987 Mueller et al.
(Continued)

FOREIGN PATENT DOCUMENTS
JP A-1-186439 7/1989
(Continued)

OTHER PUBLICATIONS
Refusing Reasons Notice issued from the Japanese Patent Office on Mar. 24, 2009 in the corresponding Japanese patent application No. 2006-511558 (and English translation).
(Continued)

*Primary Examiner*—Dalena Tran
(74) *Attorney, Agent, or Firm*—Posz Law Group, PLC

(57) ABSTRACT

A traveling control device and a traveling control program for a work vehicle in which a change in a control quantity due to an effect of vehicle body vibrations is small, fixing the desired control quantity is possible, and the control quantity can be matched with the operator's feel. A travel control program in which a first line on which the speed ratio reduces corresponding to a change in the operation stroke, a second line having hysteresis with respect to the first line and on which the speed ratio increases corresponding to a change in the operation stroke, and third lines on which the speed ratio changes corresponding to the change in the operation stroke and the change in speed ratio with respect to the change in the operation stroke is smaller than that of the first and the second line are set is installed in the control device.

10 Claims, 17 Drawing Sheets

U.S. PATENT DOCUMENTS

| | | | |
|---|---|---|---|
| 5,003,776 A * | 4/1991 | Kanai et al. | 60/434 |
| 5,325,933 A * | 7/1994 | Matsushita | 180/6.7 |
| 6,491,118 B1 | 12/2002 | Hou et al. | |
| 6,549,837 B2 | 4/2003 | Feucht et al. | |

FOREIGN PATENT DOCUMENTS

| | | |
|---|---|---|
| JP | A-05-213230 | 8/1993 |
| JP | A-11-59212 | 3/1999 |
| JP | A-2001-10526 | 1/2001 |
| JP | A-2002-19631 | 1/2002 |
| JP | A-2002-293261 | 10/2002 |

OTHER PUBLICATIONS

European Search Report dated Jun. 23, 2008 in corresponding European patent application No. 05727426.8-1523.

* cited by examiner

CALCULATION OF SPEED RATIO $y_{(t+\Delta t)}$

| COORDINATES OF POINT $(x_t, y_t)$ | AT POINT $B_1$ | ON LINE $L_{131}$ | AT POINT $B_2$ | ON FIRST LINE $L_{11}$ | AT POINT $B_3$ | ON THIRD LINE $L_{134}$ | AT POINT $B_8$ | ON SECOND LINE $L_{12}$ | WITHIN INTERNAL AREA A | ON LINE $L_{10}$ |
|---|---|---|---|---|---|---|---|---|---|---|
| $(x_{(t+\Delta t)} - x_t) \geq 0$ (RECLINING OPERATION) | FINE CONTROL AREA IN ACCORDANCE WITH LINE $L_{131}$ | FINE CONTROL AREA IN ACCORDANCE WITH LINE $L_{131}$ | IN ACCORDANCE WITH FIRST LINE $L_{11}$ | IN ACCORDANCE WITH FIRST LINE $L_{11}$ | — | IN ACCORDANCE WITH THIRD LINE $L_{134}$ NEAR PIVOT TURN AREA | IN ACCORDANCE WITH THIRD LINE $L_{134}$ NEAR PIVOT TURN AREA | CHANGE IN ACCORDANCE WITH a OF INTERMEDIATE THIRD LINE | CHANGE IN ACCORDANCE WITH a OF INTERMEDIATE THIRD LINE | IN ACCORDANCE WITH LINE $L_{10}$ |
| $(x_{(t+\Delta t)} - x_t) < 0$ (RETURNING OPERATION) | IN ACCORDANCE WITH LINE $L_{10}$ | FINE CONTROL AREA IN ACCORDANCE WITH LINE $L_{131}$ | FINE CONTROL AREA IN ACCORDANCE WITH LINE $L_{131}$ | CHANGE IN ACCORDANCE WITH a OF INTERMEDIATE THIRD LINE | IN ACCORDANCE WITH THIRD LINE $L_{131}$ NEAR PIVOT TURN AREA (CHANGE IN ACCORDANCE WITH SLOPE a) | IN ACCORDANCE WITH THIRD LINE $L_{134}$ NEAR PIVOT TURN AREA | IN ACCORDANCE WITH SECOND LINE $L_{12}$ | IN ACCORDANCE WITH SECOND LINE $L_{12}$ | CHANGE IN ACCORDANCE WITH a OF INTERMEDIATE THIRD LINE | IN ACCORDANCE WITH LINE $L_{10}$ |

FIG. 14

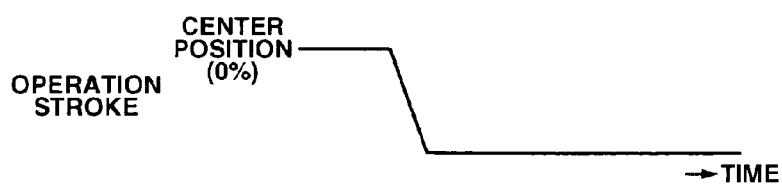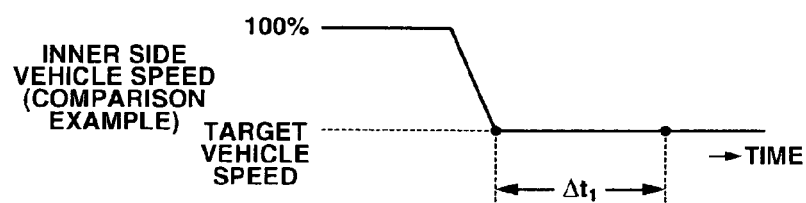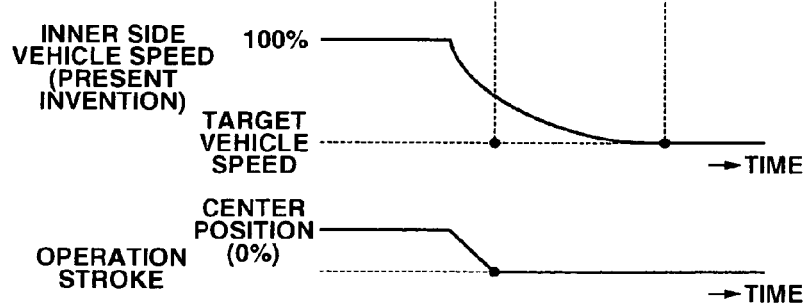

TRAVELING CONTROL DEVICE AND TRAVELING CONTROL PROGRAM FOR WORK VEHICLE OR CONTROL DEVICE AND CONTROL PROGRAM FOR WORK VEHICLE

TECHNICAL FIELD

The present invention relates to a device for controlling a control quantity, such as a speed ratio or similar, of left and right crawler tracks or wheels of a work vehicle in accordance with an operation quantity of an operation device such as an operation lever or similar, or a control program incorporated in the control device.

BACKGROUND ART

Work vehicles such as bulldozers are equipped with hydrostatic transmissions (HST).

FIG. 9 shows a system that controls a speed ratio of left and right crawler tracks using a hydraulic operation lever device and HST.

In other words, as shown in FIG. 9, drive shafts of constant capacity hydraulic motors 7, 8 are coupled to sprockets 15, 16 provided on left and right hand sides of a vehicle body. The left and the right sprockets 15, 16 mesh with the left and the right crawler tracks provided on the left and the right of the vehicle body respectively. Inlet and outlet ports 7a, 7b of a left hydraulic motor 7 are connected to outlet and inlet ports 3a, 3b of a variable capacity hydraulic pump 3 via an oil path 61 and an oil path 62 respectively.

In the same way, inlet and outlet ports 8a, 8b of a right hydraulic motor 8 are connected to outlet and inlet ports 4a, 4b of a variable capacity hydraulic pump 4 via an oil path 63 and an oil path 64 respectively.

Hydraulic pressure signals (pilot pressure) are output from a hydraulic operation lever device 65 to left and right swash plate drive units 105, 106 in accordance with the operation stroke, the left and the right swash plate drive units 105, 106 drive swash plates 3c, 4c of the left and the right hydraulic pumps 3, 4 in accordance with the pilot pressure, and varies the angle of tilt, in other words the capacity (cc/reb), of the left and the right hydraulic pumps 3, 4. When the ration of capacities of the left and the right hydraulic pumps 3, 4 is varied, the speed ratio of the left and the right crawler tracks is varied. In other words, since the quantity of oil discharged per revolution from the left and the right hydraulic motors 7, 8 is constant, so if the ratio of the hydraulic oil flow rate flowing into the left and the right hydraulic motors 7, 8 is determined, in other words if the capacity ratio of the left and the right hydraulic pumps 3, 4 is determined, the ratio of the rate of revolution of the left and the right hydraulic motors 7, 8, in other words the speed ratio of the left and the right crawler tracks (left and right sprockets) is uniquely determined.

FIG. 10 shows a system that controls the speed ratio of the left and the right crawler tracks using an electric operation lever device and HST.

An electrical signal is output from an electrical operation lever device 66 in accordance with the operation stroke, and is input to a controller 120, and a control electrical signal in accordance with the speed ratio is output from the controller 120 to left and right swash plate drive units 5, 6, and the swash plates 3c, 4c of the left and the right hydraulic pumps 3, 4 are driven by the left and the right swash plate drive units 5, 6, and otherwise the system is the same as in FIG. 9.

As a related art in connection with the HST, the following patent literature 1 is available.

Also, hydrostatic steering systems (HSS) are known in which the speed ratio of the left and the right crawler tracks of a work vehicle are controlled by adjusting the capacity of hydraulic pumps, in the same way as for HST.

As a related art in connection with the HSS, the following patent literature 2 is available.

Patent literature 1: Japanese Patent Application Laid-open No. 11-59212.

Patent literature 2: Japanese Patent Application Laid-open No. 2002-293261.

DISCLOSURE OF THE INVENTION

Problems to be Solved by the Invention

When work vehicles such as bulldozers are equipped with the systems shown in FIGS. 9 and 10, the following tasks arise.

a) To reduce fatigue, the operation stroke range (the operation range from the center point to the full stroke) of the operation lever of the work vehicle is set to be short. Within this short limited stroke range it is necessary to obtain a slack characteristic (hereafter referred to as fine control characteristic) for the change in speed ratio with respect to the operation stroke.

b) Vibrations transmitted to the operation lever from the body of the work vehicle are large, so it is difficult for the operator to hold the operation lever at the desired fixed operation stroke. Even when it is difficult to fix the desired operation stroke by holding the operation lever in this way, it is necessary that the behavior should not show large variations from the desired speed ratio.

c) To obtain the desired turning radius an operator normally reclines the operation lever fully to the full stroke side, then returns the lever towards the center position and carries out fine adjustments on the return side. When carrying out an operation such as returning after reclining an operation lever (or reclining after returning) it is necessary that the operator can obtain the desired turning radius in accordance with the operational feel of the operator.

The system using the hydraulic operation lever device 65 as explained in FIG. 9 is driven hydraulically from the operation lever device 65 to the left and the right swash plate drive units 105, 106, so the above tasks a), b), and c) were not perceived to be problems, because of delays in the hydraulic actuation.

However, the system using the electrical operation lever device 66 shown in FIG. 10 is driven electrically from the operation lever 66 to the left and the right swash plate drive units 5, 6 via the controller 120, so the response in the variation of the tilting position of the swash plates 3c, 4c of the left and the right hydraulic pumps 3, 4 to the operation of an operation lever 66a is good, so the above tasks a), b), and c) were perceived as problems. This will be explained using FIGS. 6 through 8.

FIG. 6 shows the relationship L8 between the operation stroke of the operation lever 66a and the speed ratio.

As shown in FIG. 6, when the operation stroke is in the area L81 close to the center position, the change in speed ratio with respect to the operation stroke is comparatively slack (fine control area), and when the operation stroke is in the area L82 near the full stroke position the change in speed ratio with respect to the operation stroke is comparatively severe. This indicates that in the area where the speed ratio (capacity ratio) is small, the change in turning radius corresponding to the change in speed ratio (capacity ratio) is small, and in the area where the speed ratio is large, the change in turning radius corresponding to the change in speed ratio is large, therefore the change in turning radius corresponding to a change in operation stroke is virtually constant over all areas.

As long as operation is confined to the fine control area L81 in FIG. 6 the above tasks a), b), and c) are not a problem in practice. However, if an operation is carried out along the line L82 the above tasks a), b), and c) cannot be solved.

In other words, the operation stroke range on the horizontal axis in FIG. 6 is very short as mentioned above. Therefore, even though an operator intends to operate the operation lever 66a within the very short stroke range, the actual change in turning radius is greater than intended by the operator, which results in the problem of a difference between the operator's operational feel and the actual turning radius. In the same way, even when the operator intends to hold the operation lever 66a steady, the operation stroke of the operation lever 66a is changed by vibrations transmitted from the vehicle body to the operation lever 66a, which causes a large deviation from the desired turning radius. Also, when the operation lever is given a large recline to the full stroke side and then returned towards the center position, and finely adjusted to the desired turning radius from the return side, there is the problem that the change in the speed ratio is large as shown by the arrow symbol D1 in FIG. 6, so the operator cannot obtain the desired turning radius in accordance with the operational feel of the operator.

Therefore, to solve these problems, there have been attempts to control the speed ratio in accordance with the relationship L9 between operation lever operation stroke and speed ratio, shown in FIG. 7.

According to the relationship shown in FIG. 7, when the operation lever 66a is operated from a point on the line L94 (fine control area), L91 in the direction that the operation stroke is increased and the speed ratio is decreased, the speed ratio is decrease corresponding to the change in the operation stroke in accordance with the line L94 (fine control area), L91. When the operation lever 66a is operated from a point on the line L92, L95 (fine control area) in the direction that the operation stroke is decreased and the speed ratio is increased, the speed ration is increased with respect to the change in the operation stroke in accordance with the line L92, L95 (fine control area), which have hysteresis with respect to the lines L91, L94. And when the operation lever 66a is operated from a point on the line L91 in the direction that the operation stroke is decreased, or when the operation lever 66a is operated from a point on the line L92 in the direction that the operation stroke is increased, control is carried out to maintain the speed ratio, in accordance with the line L93 on which the speed ratio does not change.

As long as the operation is confined to the fine control area L94, L95 on FIG. 7, the above tasks a), b), and c) are not problems in practice. However, when operated along the lines L91, L92 the above tasks a), b), and c) still remain.

This is because the horizontal width (range of stroke) of the line L93 for which the speed ratio does not change is narrow compared with horizontal width (range of stroke) of the fine control area L94, L95, and if departing from the line L93, the speed ratio varies rapidly along the lines L92 or L91.

Certainly, if small vibrations are transmitted by the operation lever 66a and do not cause large oscillations on the operation stroke, by moving on the line L93 the turning radius does not greatly change. However, vibrations in practice show the behavior of extending across the lines L92, L91 as indicated by the arrow symbol D2. Therefore, if departing from the line L93 the speed ratio varies rapidly along lines L92 or L91, so it is not possible to fix the desired turning radius.

Also, if the operation lever 66a is reclined towards the full stroke side, then returned towards the center position, and fine adjustments carried out on the return side to set the turning radius, the behavior shown by the arrow symbol D2 is obtained, and the speed ratio changes greatly. Therefore, the desired turning radius cannot be obtained in accordance with the operator's operational feel.

In other words, as long as operation is confined to the fine control area L94, L95, fine control characteristics can be obtained, but a broad fine control characteristic cannot be obtained over the whole operation stroke range.

As a result, turning tracks of left and right crawler tracks 10L, 10R can easily oscillate as shown in FIG. 8, and it is difficult to realize stable turning movement.

With the foregoing in view, the present invention solves the tasks a), b), and c) even when an operation device with a short operation stroke range is adopted, so that the change in control quantity (speed ratio) due to the effect of vehicle body vibrations or similar is small and it is possible to fix the desired control quantity (speed ratio), and moreover the control quantity (speed ratio) can be obtained in accordance with the operator's feel when carrying out fine adjustments by increasing and decreasing the operation stroke.

Means to Solve the Problems

The first invention is a work vehicle travel control device that controls travel of a work vehicle (1) in accordance with set lines (L1) indicating a relationship between an operation stroke of an operation device (21) and a speed ratio of left and right crawler tracks (10L, 10R) or wheels of a vehicle body (9), wherein a first line (L11) on which the speed ratio decreases corresponding to a change in the operation stroke, a second line (L12) that has hysteresis with respect to the first line (L11) and on which the speed ratio increases corresponding to a change in the operation stroke, and third lines (L131, L132, L133, L134) on which the speed ratio changes corresponding to a change in the operation stroke and the change in the speed ratio with respect to the change in the operation stroke is smaller than that of the first line (L11) and that of the second line (L12) are set, and control means (20) is provided for controlling the speed ratio to decrease in accordance with the first line (L11) when the operation device (21) is operated from a point on the first line (L11) in a direction that the speed ratio decreases, to increase in accordance with the second line (L12) when the operation device (21) is operated from a point on the second line (L12) in a direction that the speed ratio increases, to change in accordance with the third lines (L131, L132, L133, L134) when the operation device (21) is operated from a point on the first line (L11) in a direction that the speed ratio increases, or when the operation device (21) is operated from a point on the second line (L12) in a direction that the speed ratio decreases.

The second invention is a travel control program for a work vehicle in which lines (L1) indicating a relationship between an operation stroke of an operation device (21) and a speed ratio of left and right crawler tracks (10L, 10R) or wheels of a vehicle body (9) are set as described below, and which when incorporated in a travel control device (20) of a work vehicle (1) operates as described below:

1) a first line (L11) on which the speed ratio decreases corresponding to a change in the operation stroke, a second line (L12) that has hysteresis with respect to the first line (L11) and on which the speed ratio increases corresponding to a change in the operation stroke, and third lines (L131, L132, L133, L134) on which the speed ratio changes corresponding to a change in the operation stroke and the change in the speed ratio with respect to the change in the operation stroke is smaller than that of the first line (L11) and that of the second line (L12), are set, 2) when the operation device (21) is operated from a point on the first line (L11) in a direction that the speed ratio decreases, the speed ratio is calculated in accordance with the first line (L11), 3) when the operation device (21) is operated from a point on the second line (L12) in a direction that the speed ratio increases, the speed ratio is calculated in accordance with the second line (L12), 4) when the operation device (21) is operated from a point on the first line (L11) in a direction that the speed ratio increases, or when the operation device (21) is operated from a point on the second line (L12) in a direction that the speed ratio decreases, the speed ratio is calculated in accordance with the third lines (L131, L132, L133, L134).

The third invention is the first invention or the second invention, wherein the second line (L12) is set so that the change in the speed ratio with respect to the change in the operation stroke is smaller than that of the first line (L11), and the third lines (L131, L132, L133, L134) are set so that the larger the speed ratio on a line the larger the range of the operation stroke.

The fourth invention is the work vehicle travel control device in the first invention for controlling the speed ratio so that a target speed ratio is reached after a time delay from a time the operation device (21) is operated, wherein the speed ratio is controlled so that the time delay when the speed ratio is controlled in accordance with the third lines (L131, L132, L133, L134) is smaller than the time delay when the speed ratio is controlled in accordance with the first line (L11) or the second line (L12).

The fifth invention is the work vehicle travel control program in the second invention for generating a control electrical signal so that a calculated target speed ratio is reached with a time delay, wherein the control electrical signal is generated so that the time delay when the speed ratio is calculated in accordance with the third lines (L131, L132, L133, L134) is smaller than the time delay when the speed ratio is calculated in accordance with the first line (L11) or the second line (L12).

The sixth invention is the first invention or the fourth invention, wherein drive shafts of hydraulic motors (7, 8, 55) are connected to the left and the right crawler tracks (10L, 10R) or the wheels of the vehicle body (9), the operation device (21) is an electrical operation device that outputs an electrical signal corresponding to the operation stroke, a controller (20) receives the outputted electrical signal from the operation device (21), and controls the speed ratio by changing a rate of rotation of the hydraulic motors (7, 8, 55) in accordance with the operation stroke.

The seventh invention is a work vehicle travel control device that controls a control quantity of a work vehicle (1) in accordance with set lines (L3) indicating a relationship between an operation quantity of an operation device (70) and the control quantity, wherein a first line (L31) on which the control quantity changes corresponding to an increase in the operation quantity, a second line (L32) that has hysteresis with respect to the first line (L31) and on which the control quantity changes corresponding to a decrease in the operation quantity, and third lines (L331, L332, L333, L334) on which the control quantity changes corresponding to a change in the operation quantity and the change in the control quantity with respect to the change in the operation quantity is smaller than that of the first line (L31) and that of the second line (L32), are set, and control means (220) is provided for controlling the control quantity to change in accordance with the first line (L31) when the operation device (70) is operated from a point on the first line (L31) in a direction that the operation quantity increases, to change in accordance with the second line (L32) when the operation device (70) is operated from a point on the second line (L32) in a direction that the operation quantity decreases, to change in accordance with the third lines (L331, L332, L333, L334) when the operation device (70) is operated from a point on the first line (L31) in the direction that the operation quantity decreases, or when the operation device (70) is operated from a point on the second line (L32) in the direction that the operation quantity increases.

The eighth invention is a control program for a work vehicle in which lines (L3) indicating a relationship between an operation quantity of an operation device (70) and a control quantity are set as specified below, and which when incorporated in a control device (220) of the work vehicle (1) operates as specified below:

1) a first line (L31) on which the control quantity changes corresponding to an increase in the operation quantity, a second line (L32) that has hysteresis with respect to the first line (L31) and on which the control quantity changes corresponding to a decrease in the operation quantity, and third lines (L331, L332, L333, L334) on which the control quantity changes corresponding to a change in the operation quantity and the change in control quantity with respect to the change in the operation quantity is smaller than that of the first line (L31) and that of the second line (L32) are set, 2) when the operation device (70) is operated from a point on the first line (L31) in a direction that the operation quantity increases, the control quantity is calculated in accordance with the first line (L31), 3) when the operation device (70) is operated from a point on the second line (L32) in a direction that the operation quantity decreases, the control quantity is calculated in accordance with the second line (L32), and 4) when the operation device (70) is operated from a point on the first line (L31) in a direction that the control quantity decreases, or when the operation device (70) is operated from a point on the second line (L32) in a direction that the control quantity increases, the control quantity is calculated in accordance with the third lines (L331, L332, L333, L334).

The controller 20 shown in FIG. 2 calculates the speed ratio in accordance with the relationship L1 shown in FIG. 3, and controls the speed ratio.

A travel control program in which the following are set and that carries out the calculations is installed in the controller 20.

1) A first line L11 on which the speed ratio reduces corresponding to a change in the operation stroke, a second line L12 that has hysteresis with respect to the first line L11 and on which the speed ratio increases corresponding to a change in the operation stroke, and third lines L131, L132, L133, L134 on which the speed ratio changes corresponding to a change in the operation stroke and the change in speed ratio with respect to a change in the operation stroke is smaller than that of the first line L11 and that of the second line L12 are set, 2) when the operation lever device 21 is operated from a point on the first line L11 in the direction that the operation stroke increases and the speed ratio decreases, the speed ratio is calculated in accordance with the first line L11, 3) when the operation lever device 21 is operated from a point on the second line L12 in the direction that the operation stroke decreases and the speed ratio increases, the speed ratio is calculated in accordance with the second line L12, 4) when the operation lever device 21 is operated from a point on the first line L11 in the direction that the operation stroke decreases and the speed ratio increases, or when the operation device 21 is operated from a point on the second line L12 in the direction that the operation stroke increases and the speed ratio decreases, the speed ratio is calculated in accordance with the third lines L131, L132, L133, L134.

Also, the second line L12 is set so that the change in speed ratio with respect to a change in operation stroke is smaller than that of the first line L1, and the third lines L131, L132, L133, L134 are set so that the larger the speed ratio the larger the operation stroke range (third invention).

The effect of the present invention will be explained by contrast with the comparison example of FIG. 7.

The line L93 of the comparison example of FIG. 7 corresponds to line 3 of the present invention. The line L93 is a line on which the speed ratio does not change, and while on the line L93 the same value of speed ratio is maintained even if the operation stroke is changed. Moreover, the horizontal width (operation stroke range) of the line L93 on which the speed ratio does not change is extremely narrow compared with the horizontal width (operation stroke range) of the fine control lines L94, L95, and after deviating from the line L93 the speed ratio changes rapidly along the line L92 or the line L91.

Therefore when the operation stroke of the travel operation lever increases or decreases due to vibrations from the vehicle body, the speed ratio rapidly changes due to a small change in the stroke, so it is not possible to fix the desired turning radius.

Also, even if an operation in which the travel operation lever is greatly reclined to the full stroke side and then returned towards the center position, and on the return side fine adjustments are used to set the desired turning radius, the behavior indicated by the arrow D2 in FIG. 7 is seen, and the speed ratio changes greatly for a small change in stroke. Therefore, the desired turning radius cannot be obtained in accordance with the operator's operational feel. The same applies when switching from the travel operation lever return operation to the recline operation.

In contrast to this the third line (for example line L132) of the present embodiment is a line in which the speed ratio changes in response to a change in the operation stroke, and the slope is set to the same gentle slope a as the fine control area line L131. Moreover, the horizontal width (operation stroke range) of the third line L132 has sufficient width to absorb the vibrations of the vehicle body and for making fine adjustments to the turning radius. Also, the third line L132 has a slope, so after deviating from the third line L132 and moving onto the second line L12 the speed ratio does not suddenly change.

Therefore, even if the operation stroke of the travel operation lever 21a increases or decreases due to vibrations received from the vehicle body, the speed ratio does not suddenly change due to the change in stroke, but changes gently, so it is possible to fix the desired turning radius.

Also, even if an operation in which the travel operation lever 21a is greatly reclined to the full stroke side and then returned towards the center position, and on the return side fine adjustments are used to set the desired turning radius, the behavior indicated by the arrows E13, E14, and E15 in FIG. 15 is seen, so there is no large change in the speed ratio due to a change in the stroke, the change is gentle. Therefore the desired turning radius can be obtained in accordance with the operational feel of the operator.

In other words, according to the present invention, over all operation stroke ranges a broad fine control operation characteristic can be obtained, not just on the fine control area line L131. The same applies in the case that the travel operation lever is switched from the return operation to the recline operation.

As a result, stable turning travel can be carried out by the work vehicle 1 as shown in FIG. 4, without vibrations on the turning tracks of the left and the right crawler tracks 10L, 10R.

In this way, according to the present invention, even when an operation lever device 21 with a short operation stroke range is adopted, the change in speed ratio (turning radius) due to the effect of vehicle body vibrations or similar is small, and the desired speed ratio (turning radius) can be fixed, moreover, when carrying out fine adjustments by increasing and decreasing the operation stroke, the speed ratio (turning radius) can be obtained in accordance with the operational feel of the operator, so the above tasks a), b), and c) are solved.

The operation and effect of the fourth and the fifth inventions are explained using the drawings.

In FIG. 3 (FIG. 15), the lines on which the operation stroke of the travel operation lever 21a can be greatly moved are the first line L11 and the second line L21. Conversely, in FIG. 3 (FIG. 15), the lines on which the operation stroke of the travel operation lever 21a can be moved a small amount are the third line L131 including the fine control area line L131, and the second line L132, L133, L134.

Therefore if the (target) speed ratio $y(t+\Delta t)$ is calculated to be a coordinate position on the first line L11 or second line L21, a control electrical signal to which the first-order time delay modulation is applied is generated and output, as shown in FIG. 17C, and if the (target) speed ratio $y(t+\Delta t)$ is calculated to be a coordinate position on the third line L131 including the fine control area line L131, and the second line L132, L133, L134, either the control that applies the first-order time delay modulation is turned off, as shown in FIG. 17F, or a control electrical signal in which the time constant is varied to make the time delay small is generated and output, as shown in FIG. 17G. As a result, when for example the travel operation lever 21a is greatly and suddenly reclined, the inner side vehicle speed changes gently to reach the target vehicle speed with a time delay (FIG. 17C), and when for example the travel operation lever 21a is switched from the reclining operation to the return operation with small operation strokes, the inner side vehicle speed rapidly reaches the target vehicle speed (FIGS. 17F, 17G). In this way, when the operation to greatly change the turning radius is carried out, the shock applied to the operator or the vehicle body is reduced, so the operability is improved, as well as the controllability is improved when the turning radius is finely adjusted.

The sixth invention is a limitation on the configuration of the travel control device according to the first and the fourth inventions. In other words, the first or the fourth inventions are applied to a travel control device that controls the speed ratio, by connecting the drive shafts of the hydraulic motors 7, 8 (FIG. 2) or the hydraulic motor 55 (FIG. 5) to the left and the right crawler tracks 10L, 10R (or wheels) of the vehicle body 9, the operation lever device 21 is an electrical operation lever that outputs an electrical signal corresponding to the operation stroke, the electrical signal output from the operation lever device 21 is input to the controller 20, and the rate of rotation of the hydraulic motors 7, 8 (FIG. 2) or the hydraulic motor 55 (FIG. 5) is changed in accordance with the operation stroke.

The first through sixth inventions are inventions in which the control quantity is the speed ratio. In contrast, the seventh and the eighth inventions are inventions in which the control quantity including the speed ratio is generally expanded.

This is explained using FIGS. 18A and 18B as an example.

FIGS. 18A and 18B show an invention in which the operation device is a brake pedal 70, and the control quantity is a brake command signal (pump capacity).

FIG. 18A shows a system that applies brakes to left and right crawler tracks 10L, 10R, using HST as in FIG. 2. When the brake pedal is operated, a measurement signal indicating the operation stroke of the brake pedal 70 is input to a controller 220. The controller 220 calculates the brake command signal (pump capacity) in accordance with the relationship L3 shown in FIG. 18B, and outputs the brake command signal to the swash plate drive units 5, 6 of the left and the right hydraulic pumps 3, 4.

FIG. 18B shows the relationship L3 between the operation stroke of the brake pedal 70 and the brake command signal (pump capacity). When the operation stroke of the brake pedal 70 increases, the capacity of the left and the right hydraulic pumps 3, 4 decreases, which reduces the rate of rotation of the left and the right hydraulic motors 7, 8, which slows the rotation of the left and the right crawler tracks 10L, 10R, and increases the braking force. Conversely, when the operation stroke of the brake pedal 70 decreases, the capacity of the left and the right hydraulic pumps 3, 4 increases, which increases the rate of rotation of the left and the right hydraulic motors 7, 8, which increases the rotation of the left and the right crawler tracks 10L, 10R, and releases the braking force.

In FIG. 18B, the second line L32 is set to the same slope as the first line L31, and the third lines L331, L332, L333, L334 ... have a slope that is smaller than that of the first line L31 and the second line L32 and are set to the same operation stroke range. In FIG. 18B the operation stroke range of the third lines L331, L332, L333, L334 ... is the same as that of the fine control area line L331.

Therefore over the whole operation stroke range, fine control operation can be carried out over a broad range, same as for the first and the second inventions.

BEST MODE FOR CARRYING OUT THE INVENTION

The following is an explanation of the embodiments of the present invention with reference to the drawings.

In the present embodiment the bulldozer shown in FIG. 1 is assumed to be the work vehicle.

As shown in FIG. 1, a work vehicle (bulldozer) 1 is provided with a pair of crawler tracks 10L, 10R on the left and the right of a vehicle body 9. The left and the right crawler tracks 10L, 10R are coupled to sprockets 15, 16 respectively. A work tool (blade) 18 that can be freely raised and lowered is provided on the front of the vehicle body 9. An operator's seat 19 is provided at the upper part of the rear section of the vehicle body 9. An engine 2 is mounted within and to the front of the vehicle body 9. An operation lever 21a for traveling is provided to the side of the operator's seat 19 in a position that the operator can easily operate.

FIG. 2 shows the configuration of the system (control device) of a first embodiment. This system is installed in the work vehicle 1. FIG. 2 shows a system that controls the speed ratio of the left and the right crawler tracks 10L, 10R using an electrical operation lever device 21 and HST.

In other words, as shown in FIG. 2, the output shaft of an engine 2 is coupled to the drive shafts of left and right variable capacity hydraulic pumps 3, 4. The tilt position (tilt angle) of swash plates 3c, 4c of the left and the right hydraulic pumps 3, 4 are driven by left and right swash plate drive units 5, 6 respectively.

On the other hand, the left and the right sprockets 15, 16 are coupled to the drive shafts of left and right constant capacity hydraulic motors 7, 8 via final reduction gears 13, 14 respectively. Left and right brake devices 11, 12 are provided on the drive shafts of the left and the right hydraulic motors 7, 8 respectively, to stop the rotation of the left and the right hydraulic motors 7, 8.

Inlet and outlet ports 7a, 7b of the left hydraulic motor 7 are connected to outlet and inlet ports 3a, 3b of the variable capacity hydraulic pump 3 via an oil path 61 and an oil path 62 respectively.

In the same way, inlet and outlet ports 8a, 8b of the right hydraulic motor 8 are connected to outlet and inlet ports 4a, 4b of the variable capacity hydraulic pump 4 via an oil path 63 and an oil path 64 respectively.

The electrical operation lever device 21 includes a travel operation lever 21a and an operation stroke sensor 21b that measures the operation stroke. A potentiometer, for example, may be used as the operation stroke sensor 21b.

The travel operation lever 21a can be freely reclined in both the left and the right directions from the center which is the center position as viewed by the operator. The center position corresponds to the work vehicle 1 "traveling directly forward", reclining to the right side corresponds to the work vehicle 1 "turning right", and reclining to the left side corresponds to the work vehicle 1 "turning left". When the operation lever 21a is in the center position (operation stroke is 0%) the speed ratio (rate of revolution ratio) of the left and the right crawler tracks 10L, 10R is 1:1 (100%), and the speed ratio of the left and the right crawler tracks 10L, 10R becomes smaller as the operation stroke of the operation lever 21a increases. In the present embodiment, at full stroke (operation stroke 100%) the velocity of one of the left and the right crawler tracks 10L, 10R (when reclined to the left the left crawler track 10L, when reclined to the right the right crawler track 10R) is zero, so the speed ratio becomes zero, and a left pivot turn or a right pivot turn is carried out. In the present specification reclining the operation lever 21a from the center position towards the full stroke side is defined as the "reclining direction", and returning the operation lever 21a from the full stroke side towards the center position is defined as the "returning direction" for use in explanations. The work vehicle 1 can also execute a stationary turn, but this is irrelevant to the present invention, so the explanation is omitted.

An electrical measurement signal indicating the operation stroke measured by the operation stroke sensor 21b is input to the controller 20. The controller 20 carries out a calculation process that is described later based on the input operation stroke, calculates the speed ratio corresponding to the current operation stroke, generates a control electrical signal to rotate the left and the right crawler tracks 10L, 10R at the calculated speed ratio, and outputs the control electrical signal to the left and the right swash plate drive units 5, 6. The left and the right swash plate drive units 5, 6 drive the swash plates 3c, 4c of the left and the right hydraulic pumps 3, 4 respectively, in accordance with the input control electrical signal. In this way the ratio of the capacities (cc/reb) of the left and the right hydraulic pumps 3, 4 is varied. When the ratio of the capacities of the left and the right hydraulic pumps 3, 4 is varied, the speed ratio of the left and the right crawler tracks 10L, 10R is varied accordingly, and the turning radius of the work vehicle 1 is varied accordingly. Here, the relationship between the ratio of capacities of the left and the right hydraulic pumps 3, 4, the speed ratio of the left and the right crawler tracks 10L, 10R, and the turning radius of the work vehicle 1 is explained.

First, the capacity ratio of the left and the right hydraulic pumps is defined as follows.

Pump capacity ratio=(Pump capacity on the inside of the turn)/(Pump capacity on the outside of the turn) (1)

Also, the speed ratio is defined as follows.

Speed ratio $a$=(Crawler track speed on inside of turn)/(Crawler track speed on outside of the turn) (2)

In the present embodiment, the capacity of the hydraulic pump on the inside of the turn, the side to which the travel operation lever 21a is reclined (if reclined to the left, the capacity of the left hydraulic pump 3), is reduced compared with the capacity when traveling forward, and the capacity of the hydraulic pump on the outside of the turn, the side to which the travel operation lever 21a is not reclined (if reclined to the left, the capacity of the right hydraulic pump 3), is the capacity when traveling forward, so a turn is executed.

If the pump capacity ratio is 100% the work vehicle 1 travels forward, and if the pump capacity ratio is 0% the work vehicle 1 executes a pivot turn.

The quantity of oil discharged per revolution of the left and the right hydraulic motors 7, 8 is constant, so if the ratio of the oil flow rates in the left and the right hydraulic motors 7, 8 is determined, in other words the capacity ratio of the left and the right hydraulic pumps 3, 4 is determined, the ratio of the rates of revolution of the left and the right hydraulic motors 7, 8, in other words the speed ratio a of the left and the right crawler tracks 10L, 10R (left and right sprockets 15, 16) is uniquely determined.

Next, the relationship between the speed ratio a and the turn radius R will be explained using FIG. 11.

As shown in FIG. 11, when the work vehicle 1 is executing a right turn for example, the parameters are defined as follows.

VL: Speed of the left crawler track
VR: Speed of the right crawler track
VA: Average speed of the left and the right crawler tracks
a: Speed ratio
G: Gauge width
R: Turn radius
Where, $VA=(VL+VR)/2$ (3)

So from Equation (2) above, $a=VR/VL$ (4)

Also, the relationship $VA:R=(VL-VR):G$ (5)

can be established. Therefore from Equations (3), (4), and (5), it is possible to obtain $R=G(1+a)/2(1-a)$ (6)

In this way it can be seen that the turn radius R does not depend on the speed of the crawler tracks, but only on the speed ratio a. In other words, when the pump capacity ratio is determined, the turn radius R is uniquely determined.

If the relationship of Equation (6) is plotted as the relationship between the pump capacity ratio and the turn radius R, the graph of FIG. 12 is obtained.

As can be seen from FIG. 12, in the region where the pump capacity ratio is large, the change in turn radius R for the same change in capacity ratio is large, and in the region where the pump capacity ratio is small, the change in turn radius R for the same change in capacity ratio is small.

Next, instead of the system according to the first embodiment shown in FIG. 2, the system according to a second embodiment shown in FIG. 5 may be installed in the work vehicle 1. FIG. 5 shows a system that controls the speed ratio of the left and the right crawler tracks 10L, 10R, using the electrical operation lever device 21 and HSS. Elements of the configuration that are the same as in FIG. 2 have been given the same reference numerals, and the explanation has been omitted as appropriate.

In other words, as shown in FIG. 5, a PTO shaft 30 is coupled to the output shaft of the engine 2. The PTO shaft 30 is coupled to a transmission 32 via a torque converter 31. Also, the PTO shaft 30 is coupled to the drive shaft of a variable capacity hydraulic pump 51 for the HSS. Also, the PTO shaft 30 is coupled to the drive shaft of a hydraulic pump 53 for a work tool.

The tilt position (tilt angle) of a swash plate 51c of the hydraulic pump 51 for the HSS is driven by a swash plate drive unit 52.

Output and input ports 51a, 51b of the hydraulic pump 51 for the HSS are connected to input and output ports 54a, 54b of a direction and flow rate control valve 54 via oil paths 67, 68 respectively. Input and output ports 54c, 54d of the direction and flow rate control valve 54 are connected to input and output ports 55a, 55b respectively of a hydraulic motor 55 for the HSS via oil paths 69, 70.

The valve position of the direction and flow rate control valve 54 is varied in accordance with an control electrical signal applied to electromagnetic solenoids 24, 25.

The swash plate drive unit 52 drives the tilt position of a swash plate 51c of the hydraulic pump 51 for the HSS so that the differential pressure between the front and the rear of the direction and flow rate control valve 54 is constant. In this way the flow rate supplied to the hydraulic motor 55 for the HSS is uniquely determined in accordance with the stroke position (aperture area) of the direction and flow rate control valve 54.

A bevel gear 33 is connected to the output shaft of the transmission 32. The bevel gear 33 meshes with a bevel gear 34. The bevel gear 34 is installed on an axle shaft 35. A left and right planetary gear mechanism 40L, 40R is provided on the left and the right of the axle shaft 35 respectively.

The left planetary gear mechanism 40L includes a ring gear 41L, a sun gear 42L, a planetarium gear 43L, and a carrier gear 44L. In the same way, the right planetary gear mechanism 40R includes a ring gear 41R, a sun gear 42R, a planetarium gear 43R, and a carrier gear 44R.

The left and the right ring gears 41L, 41R are installed on the left and the right of the axle shaft 35 respectively. The left and the right ring gears 41L, 41R mesh with the left and the right planetarium gears 43L, 43R respectively. The left and the right planetarium gears 43L, 43R mesh with the left and the right sun gears 42L, 42R respectively. The left and the right planetarium gears 43L, 43R are coupled to the left and the right carriers 44L, 44R, and via left and right final reduction gears 46L, 46R to the left and the right sprockets 15, 16. Left and right brake devices 48L, 48R are provided on left and right carriers 47L, 47R, to stop the rotation of the left and the right carriers 47L, 47R.

A first gear 36 is installed on the drive shaft of the hydraulic motor 55 for the HSS. The first gear 36 meshes with a second gear 37. The second gear 37 meshes with the left side sun gear 42L. Also, the second gear 37 meshes with a third gear 38. The third gear 38 meshes with the right side sun gear 42R.

A transmission output rate of rotation sensor 26 is provided on the transmission 32 to measure the rate of rotation of the output shaft of the transmission 32. An electrical measurement signal indicating the rate of rotation measured by the transmission output rate of rotation sensor 26 is input to the controller 20.

The controller 20 carries out a calculation process that is described later based on the operation stroke input from the operation stroke sensor 21b and the rate of rotation of the transmission output shaft input from the transmission output rate of rotation sensor 26, calculates the speed ratio corresponding to the current operation stroke, generates an control electrical signal to rotate the left and the right crawler tracks 10L, 10R at the calculated speed ratio, and outputs the control electrical signal to the electromagnetic solenoids 24, 25 of the direction and flow rate control valve 54. Specifically, the rotation direction and rate of rotation of the hydraulic motor 55 for the HSS required to obtain the calculated speed ratio is obtained based on the measured rate of rotation of the transmission output shaft, and the control electrical signal necessary to obtain the required rotation direction and rate of rotation is generated and output to the electromagnetic solenoids 24, 25 of the direction and flow rate control valve 54.

When the hydraulic motor 55 for the HSS is stopped, rotation of the left and the right sun gears 42L, 42R is locked, and the carriers 44L, 44R rotate at the same rate and in the same direction, in accordance with the rate of rotation of the output shaft of the transmission 32. In this way, the left and the right crawler tracks 10L, 10R move forward or backward at the same speed (traveling straight).

On the other hand, when the hydraulic motor 55 for the HSS rotates in a specified rotation direction at a specified rate of rotation, the left and the right sun gears 42L, 42R rotate in mutually opposite directions at a speed corresponding to the specified rate of rotation. Therefore the carrier from among the left and the right carriers 44L, 44R corresponding to the direction of rotation of the hydraulic motor 55 for the HSS is geared up relative to the rate of rotation of the output shaft of the transmission 32, and the other carrier is geared down. The speed increase ratio and the speed decrease ratio of the left and the right carriers 44L, 44R, in other words the ratio of rates of rotation, are determined by the rate of rotation of the hydraulic motor 55 for the HSS. The speed ratio of the left and the right crawler tracks 10L, 10R is determined by the rate of rotation of the output shaft of the transmission 32, and the ratio of rates of rotation of the left and the right carriers 44L, 44R.

Next, the processes carried out by the controller 20 assuming the system configuration of the first embodiment are explained. For the system configuration of the second embodiment the same processes are carried out, so their explanation is omitted.

FIG. 3 shows the relationship L1 between the operation stroke of the operation lever and the speed ratio for the present embodiment. The controller 20 calculates the speed ratio in accordance with the relationship L1 shown in FIG. 3, and controls the speed ratio.

In other words, a travel control program that sets and calculates the following details is installed in the controller 20.

1) A first line L11 in which the speed ratio decreases in accordance with changes in the operation stroke, a second line L12 that has hysteresis with respect to the first line L11 and in which the speed ratio increases in accordance with changes in the operation stroke, and third lines L131, L132, L133, L134 in which the speed ratio changes in accordance with changes in the operation stroke and the change in speed ratio with respect to a change in operation stroke is smaller than that of the first line L11 and the second line L12, are set.

2) When the operation lever device 21 is operated from a point on the first line L11 in the direction that the operation stroke increases and the speed ratio decreases, the speed ratio is calculated in accordance with the first line L11.

3) When the operation lever device 21 is operated from a point on the second line L12 in the direction that the operation stroke decreases and the speed ratio increases, the speed ratio is calculated in accordance with the second line L12.

4) When the operation lever device 21 is operated from a point on the first line L11 in the direction that the operation stroke decreases and the speed ratio increases, or when the operation lever device 21 is operated from a point on the second line L12 in the direction that the operation stroke increases and the speed ratio decreases, the speed ratio is calculated in accordance with the third lines L131, L132, L133, L134 . . . .

Also, the second line L12 is set so that the change in speed ratio corresponding to a change in the operation stroke is smaller than that of the first line L11, and the third lines L131, L132, L133, L134 . . . are set so that the larger the speed ratio the larger the operation stroke range.

When this travel control program is installed in the controller 20, the controller 20 calculates the speed ratio based on the current measured operation stroke, and so that the calculated speed ratio can be obtained an control electrical signal is output to control the capacities of the left and the right hydraulic pumps 3, 4 in the case of the first embodiment, and to control the rotation direction and rate of rotation of the hydraulic motor 55 for the HSS in the case of the second embodiment.

The relationship L1 shown in FIG. 3 is recorded in a memory device within the controller 20. In this case the relationship L1 shown in FIG. 3 may be recorded in the form of calculation formulae in which the speed ratio can be calculated from the operation stroke, or the relationship between the operation stroke and the speed ratio may be recorded in the form of a data table.

The relationship L1 shown in FIG. 3 is obtained as follows, and recorded in the memory device within the controller 20.

The operation stroke on the horizontal axis of FIG. 3 is assumed to be the X-axis, the speed ratio on the vertical axis is assumed to be the Y-axis, and the values of an arbitrary operation stroke (%) and speed ratio (%) are expressed by the point at the two-dimensional coordinate position (x, y).

1) First, the point B3 (x3, 0) with the vehicle speed ratio 0 is defined. The point B3 is defined as the point at which the rotation of one of the hydraulic motors of the left and the right hydraulic motors 7, 8 is stopped and a pivot turn is carried out, the starting point for a stationary turn in which the left and the right hydraulic motors 7, 8 rotate in mutually opposite directions.

2) Next, the line L10, the range of operation stroke from the center position, in other words the point B0 (0, 100) for which the speed ratio remains 100% (travel forward), in other words, the range of "play", is defined. The range of "play" is determined as the range of operation stroke that is capable of absorbing the variation in the center position. The upper limit of the "play" in the operation stroke, or the operation stroke x1 at which turning begins (at which it is intended that steering starts to become effective), is defined as the point B1 (x1, 100).

3) Next, the fine control line L131 is set connecting the points B1 (x1, 100) and B2 (x2, y2). The slope a ($=\Delta y/\Delta x$) of the fine control area line L131 and the operation stroke range B1 to B2 (x1 to x2) are determined so that fine control operations are possible when the turning radius is large and the stroke range of the first line L1 (B2 to B3 (x2 to x3)) is a sufficient range. Also, taking into consideration the tasks a), b), and c) referred to above, the slope a (=Δy/Δx) of the fine control area line L131 is gentle and the operation stroke range B1 to B2 (x1 to x2) is a broad range. The slope a (=Δy/Δx) of the fine control area line L131 is a value that is not zero, in other words the slope is a specific value so that the speed ratio changes corresponding to a change in the operation stroke. On the fine control area line L131, the speed ratio changes in accordance with the changes in operation stroke along this fine control area line L131 not only when operated so that the operation stroke increases (the direction that the speed ratio decreases), but also when operated so that the operation stroke decreases (the direction that the speed ratio increases). In other words, the fine control area line L131 is a third line.

4) Next, the first line L11 is set connecting point B2 (x2, y2) and point B3 (x3, 0). The slope b (Δy/Δx) of the first line L11 is set to be a value more steep than the slope a of the fine control area line L131.

5) Next, the third line L134 near to the pivot turn area is set, by connecting points B3 (x3, 0) and B8 (x8, y8). The slope of the third line L134 near the pivot turn area is set to the same gentle slope a as the fine control area line L131, so that fine control operation is possible. The operation stroke range B3 to B8 (x3 to x8) of the third line L134 near the pivot turn area is set to a shorter range than the operation stroke range B1 to B2 (x1 to x2) of the fine control area line L131. As stated in connection with FIG. 12, in the region where the pump capacity ratio is large, in other words on the fine control area line L131, the change in turning radius R for the same change in capacity ratio is large, and in the region where the pump capacity ratio is small, in other words on the third line L134 near the pivot turn area, the change in turning radius R for the same change in capacity ratio is small. Therefore, if the operation stroke range B3 to B8 (x3 to x8) of the third line L131 near the pivot turn area is made larger, when the travel operation lever 21a is returned from the reclined state of the travel operation lever 21a, the operation stroke range of the second line L12 is narrowed by the amount of the operation stroke range B3 to B8 (x3 to x8) of the third line L134, so the amount of change in the turn radius is reduced. The same applies when the travel operation lever 21a is reclined from the returned state. Therefore it is necessary to ensure the operation stroke range of the second line L12 when returning the travel operation lever 21a from the reclined state, or the operation stroke range of the first line L11 when reclining the travel operation lever 21a from the returned state, and to ensure the amount of change in the turn radius. Therefore, the stroke range B3 to B8 (x3 to x8) of the third line L134 near the pivot turn area is set to be the minimum operation stroke range for which fine control operation is possible near the pivot turn area.

6) The points B1 (x1, 100) and B8 (x8, y8) have been determined, so the second line L12 is determined as the line joining these points B8 (x8, y8) and B1 (x1, 100). The slope c of the second line L12 is set at a value that is more gentle than the slope b of the first line L11 and more severe than the slope a of the fine control area line L131.

7) The first line L11 and the second line L12 have been determined, so the intermediate third lines L132, L133 . . . having the same slope as the slope a of the fine control area line L131 are determined by joining arbitrary points on the first line L11 (but excluding the end points B2, B3) and arbitrary points on the second line (but excluding the end points B1, B8). The operation stroke range of the intermediate third lines is set so that the larger the speed ratio the larger the operation stroke range. For example, the line L132 joining points B6 (x6, y6) and B7 (x7, y7) has a speed ratio that is larger than the line L133 joining points B4 (x4, y4) and B5 (x5, y5) (the values of speed ratio y6, y7 of the line L132 are larger than the values of speed ratio y4, y5 of the line L133), so the operation stroke range B6 to B7 (x6 to x7) of the line L132 is greater than the operation stroke range B4 to B5 (x4 to x5) of the line L133.

As a result, the third lines L131, L132, L133, L134 . . . including the fine control area line L131 (which is also a third line) and the third line near the pivot turn area L134 are set so that the larger the speed ratio of the line the larger the operation stroke range. The reason for this, as was stated in connection with FIG. 12, is to ensure the operation stroke range of the second line L12 when returning the travel operation lever 21a from the reclined state, or to ensure the operation stroke range of the first line L11 when reclining the travel operation lever 21a from the returned state, and to ensure the amount of change in the turn radius.

8) The area enclosed by the fine control area line L131, the first line L11, the third line near the pivot turn area L134, and the second line L12 is defined as the area A.

In this way, the relationship L1 between the operation stroke and the speed ratio is determined. The controller 20 successively carries out calculations to renew the speed ratio in accordance with the details of the processes shown in FIGS. 13 and 14, based upon the relationship L1 shown in FIG. 3. The controller 20 reads the measured value of the operation stroke of the travel operation lever 21a at predetermined intervals of time Δt, and carries out the process. In the following the parameters are defined as follows.

xt: Present operation stroke
x(t+Δt): New operation stroke
yt: Present speed ratio (present control electrical signal)
y(t+Δt): New speed ratio (new control electrical signal)

As shown in FIG. 13, first the present operation stroke xt and the present speed ratio yt are read (Step 101), then the new operation stroke x(t+Δt) is read (Step 102).

Next, the new speed ratio y(t+Δt) is calculated using the conditions shown in FIG. 14 and the relationship L1 of FIG. 3, based on the present operation stroke xt, the present speed ratio yt, and the new operation stroke x(t+Δt) that have been read (Step 103).

Next, the present operation stroke xt is overwritten with the new operation stroke x(t+Δt) read in Step 102 (Step 104; xt←x(t+Δt)). Also, the present speed ratio yt is overwritten with the new speed ratio y(t+Δt) calculated in Step 103 (Step 105; yt←y(t+Δt)).

Next, the procedure returns to Step 101 and subsequently the same process is executed repeatedly.

FIG. 14 is a table that explains the details of the process in Step 103, setting the conditions for calculating the new speed ratio y(t+Δt).

In other words, as shown in FIG. 14, by determining whether the difference in operation stroke x(t+Δt)−xt is equal to or greater than zero or smaller than zero, it is determined whether the travel operation lever 21a is being reclined or returned, and based upon this result and the present coordinate position (xt, yt), the new speed ratio y(t+Δt) is calculated.

The following is an explanation of FIG. 14 with reference to FIG. 15.

1) When the present coordinate position (xt, yt) is on the line L10 (but excluding point B1), and the travel operation lever 21a is being reclined, as indicated by the arrow E1 on FIG. 15, the new Y-axis coordinate position as the new speed ratio y(t+Δt) is obtained on the line L10 corresponding to the new operation stroke x(t+Δt). Also, when the present coordinate position (xt, yt) is on the line L10 (but excluding point B0), and the travel operation lever 21a is being returned, as indicated by the arrow E2 on FIG. 15, the new Y-axis coordinate position as the new speed ratio y(t+Δt) is obtained on the line L10 corresponding to the new operation stroke x(t+Δt). In this case the work vehicle 1 travels straight forward.

2) When the present coordinate position (xt, yt) is on the fine control area line L131 (but excluding point B2), and the travel operation lever 21a is being reclined, as indicated by the arrow E3 on FIG. 15, the new Y-axis coordinate position as the new speed ratio y(t+Δt) is obtained on the fine control area line L131 corresponding to the new operation stroke x(t+Δt). Also, when the present coordinate position (xt, yt) is on the fine control area line L131 (but excluding point B1), and the travel operation lever 21a is being returned, as indicated by the arrow E4 on FIG. 15, the new Y-axis coordinate position as the new speed ratio y(t+Δt) is obtained on the fine control area line L131 corresponding to the new operation stroke x(t+Δt). In this case the work vehicle 1 turns in a large turning radius in accordance with the fine control operation.

3) When the present coordinate position (xt, yt) is on the first line L11 (but excluding point B3), and the travel operation lever 21a is being reclined, as indicated by the arrow E5 on FIG. 15, the new Y-axis coordinate position as the new speed ratio y(t+Δt) is obtained on the first line L11 corresponding to the new operation stroke x(t+Δt). In this case the work vehicle 1 turns with a turning radius that is smaller compared with that of the fine control area.

4) When the present coordinate position (xt, yt) is on the third line L134 near the pivot turn area (but excluding point B8), and the travel operation lever 21a is being returned from the point B3 (full stroke), as indicated by the arrow E6 on FIG. 15, the new Y-axis coordinate position as the new speed ratio y(t+Δt) is obtained on the third line L134 corresponding to the new operation stroke x(t+Δt). Also, when the present coordinate position (xt, yt) is on the third line L134 (but excluding point B3), and the travel operation lever 21a is being reclined from the point B8, as indicated by the arrow E7 on FIG. 15, the new Y-axis coordinate position as the new speed ratio y(t+Δt) is obtained on the third line L134 corresponding to the new operation stroke x(t+Δt). When the reclining or returning operation is being carried out on the third line L134 near the pivot turn area (but excluding points B3 and B8), as indicated by the arrow E8 on FIG. 15, the new Y-axis coordinate position as the new speed ratio y(t+Δt) is obtained on the third line L134 corresponding to the new operation stroke x(t+Δt). In this case, the work vehicle 1 turns with an extremely small turning radius that is nearly a pivot turn, in accordance with the fine control operation.

5) When the present coordinate position (xt, yt) is on the second line L12 (but excluding point B1), and the travel operation lever 21a is being returned, as indicated by the arrow E9 on FIG. 15, the new Y-axis coordinate position as the new speed ratio y(t+Δt) is obtained on the second line L12 corresponding to the new operation stroke x(t+Δt). In this case, the work vehicle 1 turns with a turning radius that is small compared with that of the fine control area.

6) When the present coordinate position (xt, yt) (for example the point B4) is on the first line L11 (but excluding points B2 and B3), and the travel operation lever 21a is being returned (when the travel operation lever 21a is switched to the return operation from the recline operation), as indicated by the arrow E10 on FIG. 15, the new Y-axis coordinate position as the new speed ratio y(t+Δt) is obtained on the intermediate third line (L133) that passes through the present coordinate position (xt, yt) (point B4) corresponding to the new operation stroke x(t+Δt). If the travel operation lever 21a is further returned, as shown by the arrow E11, and if the present coordinate position (xt, yt) is on the second line L12 (but excluding points B1 and B8) (for example point B5), in accordance with 5) above, the new Y-axis coordinate position as the new speed ratio y(t+Δt) is obtained on the second line L12 corresponding to the new operation stroke x(t+Δt). When the reclining or returning operation is being carried out on the third line (L133) (but excluding points B4 and B5), as indicated by the arrow E12, the new Y-axis coordinate position as the new speed ratio y(t+Δt) is obtained on the third line (L133) corresponding to the new operation stroke x(t+Δt). In this case, fine adjustment of the turning radius can be carried out in the work vehicle 1 using the fine control operation.

The same applies in the case that the operation lever 21a is returned at another point (an arbitrary different point) on the first line L11. In other words, when the present coordinate position (xt, yt) (point B6) is on the first line L11 (but excluding points B2 and B3), and the travel operation lever 21a is returned (when the travel operation lever 21a is switched to the return operation from the recline operation), as indicated by the arrow E13 on FIG. 15, the new Y-axis coordinate position as the new speed ratio y(t+Δt) is obtained on the intermediate third line (L132) that passes through the present coordinate position (xt, yt) (point B6) corresponding to the new operation stroke x(t+Δt). If the travel operation lever 21a is further returned, as shown by the arrow E14, and if the present coordinate position (xt, yt) is on the second line L12 (but excluding points B1 and B8) (point B7), in accordance with 5) above, the new Y-axis coordinate position as the new speed ratio y(t+Δt) is obtained on the second line L12 corresponding to the new operation stroke x(t+Δt). When the reclining or returning operation is being carried out on the third line (L132) (but excluding points B6 and B7), as indicated by the arrow E15, the new Y-axis coordinate position as the new speed ratio y(t+Δt) is obtained on the third line (L132) corresponding to the new operation stroke x(t+Δt). In this case, fine adjustment of the turning radius can be carried out in the work vehicle 1 using the fine control operation.

7) When the present coordinate position (xt, yt) (for example point B5) is on the second line L12 (but excluding points B1 and B8), and the travel operation lever 21a is being reclined (when the travel operation lever 21a is switched to the recline operation from the return operation), as indicated by the arrow E16 on FIG. 15, the new Y-axis coordinate position as the new speed ratio y(t+Δt) is obtained on the intermediate third line (L133) that passes through the present coordinate position (xt, yt) (B5) corresponding to the new operation stroke x(t+Δt). If the travel operation lever 21a is further reclined, as shown by the arrow E17, and if the present coordinate position (xt, yt) is on the first line L11 (but excluding points B2 and B3) (for example point B4), in accordance with 3) above, the new Y-axis coordinate position as the new speed ratio y(t+Δt) is obtained on the first line L11 corresponding to the new operation stroke x(t+Δt). In this case, fine adjustment of the turning radius can be carried out in the work vehicle 1 using the fine control operation.

The same applies in the case that the operation lever 21a is reclined at another point (an arbitrary different point) on the second line L12. In other words, when the present coordinate position (xt, yt) (point B7) is on the second line L12 (but excluding points B1 and B8), and the travel operation lever 21a is reclined (when the travel operation lever 21a is switched to the recline operation from the return operation), as indicated by the arrow E18 on FIG. 15, the new Y-axis coordinate position as the new speed ratio y(t+Δt) is obtained on the intermediate third line (L132) that passes through the present coordinate position (xt, yt) (B7) corresponding to the new operation stroke x(t+Δt). If the travel operation lever 21*a* is further reclined, as shown by the arrow E19, and if the present coordinate position (xt, yt) is on the first line L11 (but excluding points B2 and B3) (point B6), in accordance with 3) above, the new Y-axis coordinate position as the new speed ratio y(t+Δt) is obtained on the first line L11 corresponding to the new operation stroke x(t+Δt). In this case, fine adjustment of the turning radius can be carried out in the work vehicle 1 using the fine control operation.

The effect of the present embodiment as described above will be explained by contrast to a comparison example in FIG. 7.

The line L93 of the comparison example of FIG. 7 corresponds to the third line of the present embodiment. The line L93 is a line on which the speed ratio does not change, and as long as the operation stroke is changed on the line L93, the speed ratio maintains the same value. Moreover, the horizontal width (range of operation stroke) of the line L93 on which the speed ratio does not change is extremely narrow compared with horizontal width (range of operation stroke) of the fine control lines L94, L95, and after deviating from the line L93 the speed ratio changes rapidly along the lines L92 or L91.

Therefore, when the operation stroke of the travel operation lever increases or decreases due to vibrations received from the vehicle body, the speed ratio changes rapidly due to a small change in stroke, so it is not possible to fix the desired turning radius.

Also, even if an operation in which the travel operation lever is greatly reclined to the full stroke side and then returned towards the center position, and on the return side fine adjustments are used to set the desired turning radius, the behavior indicated by the arrow D2 in FIG. 7 is seen, and the speed ratio changes greatly for a small change in stroke. Therefore, the desired turning radius cannot be obtained in accordance with the operator's operational feel. The same applies when switching from the travel operation lever return operation to the recline operation.

In contrast to this the third line (for example line L132) of the present embodiment is a line in which the speed ratio changes in response to a change in the operation stroke, and the slope is set to the same gentle slope a as the fine control area line L131. Moreover, the horizontal width (operation stroke range) of the third line L132 has sufficient width to absorb the vibrations of the vehicle body and for making fine adjustments to the turning radius. Also, the third line L132 has a slope, so after deviating from the third line L132 and moving onto the second line L12 the speed ratio does not suddenly change.

Therefore, even if the operation stroke of the travel operation lever 21*a* increases or decreases due to vibrations received from the vehicle body, the speed ratio does not suddenly change due to the change in stroke, but changes gently, so it is possible to fix the desired turning radius.

Also, even if an operation in which the travel operation lever 21*a* is greatly reclined to the full stroke side and then returned towards the center position, and on the return side fine adjustments are used to set the desired turning radius, the behavior indicated by the arrows E13, E14, and E15 in FIG. 15 is seen, so there is no large change in the speed ratio due to a change in the stroke, the change is gentle. Therefore the desired turning radius can be obtained in accordance with the operational feel of the operator.

In other words, according to the present embodiment, over all operation stroke ranges a broad fine control operation characteristic can be obtained, not just on the fine control area line L131. The same applies in the case that the travel operation lever is switched from the return operation to the recline operation.

As a result, stable turning travel can be carried out by the work vehicle 1 as shown in FIG. 4, without vibrations on the turning tracks of the left and the right crawler tracks 10L, 10R.

In this way, according to the present embodiment, even when an operation lever device 21 with a short operation stroke range is adopted, the change in speed ratio (turning radius) due to the effect of vehicle body vibrations or similar is small, and the desired speed ratio (turning radius) can be fixed, moreover, when carrying out fine adjustments by increasing and decreasing the operation stroke, the speed ratio (turning radius) can be obtained in accordance with the operational feel of the operator, so the above tasks a), b), and c) are solved.

Many variations to the embodiments described above are possible.

In the above explanation each of the third lines L131, L132, L133, L134 . . . were set to have the same slope a as that of the fine control area line L131, however, the slope of each third line L131, L132, L133, L134 . . . may be different.

In FIG. 3 (FIG. 15) the change in speed ratio with respect to a change in operation stroke, in other words Δy/Δx, for the second line L12 is set to be smaller than that of the first line L11 (the slope c of the second line L12 is smaller than the slope b of the first line L11), and the operation stroke range of the third lines L131, L132, L133, L134 . . . is set so that the larger the speed ratio the larger the operation stroke range.

However, the speed ratio may be calculated in accordance with the relationship L2 between operation stroke and speed ratio, as shown in FIG. 16A.

In FIG. 16A the slope of the second line L22 is set to be the same as that of the first line L21, and the third lines L232, L233 . . . are set to have the same stroke range. As shown by the arrows F1, F2, F3, F4 in FIG. 16A, if the travel operation lever 21*a* is operated from a point on the first line L21 in the direction that reduces the operation stroke (from the direction in which the speed ratio decreases to the direction in which the speed ratio increases), or if the travel operation lever 21*a* is operated from a point on the second line L22 in the direction that increases the operation stroke (from the direction in which the speed ratio increases to the direction in which the speed ratio decreases), on the third lines the speed ratio changes corresponding to a change in the operation stroke, and the speed ratio is calculated in accordance with the third lines L232, L233 . . . for which the change in speed ratio corresponding to a change in operation stroke is smaller than that of the first line L21 and the second line L22.

Also, the speed ratio may be calculated in accordance with the relationship L10 between the operation stroke and the speed ratio as shown in FIG. 16B.

In FIG. 16B, the second line L102 is set to the same slope as that of the first line L101, and the third lines L1031, L1032, L1033, L1034 . . . have a smaller slope than that of the first line L101 and the second line L102, and are set with the same operation stroke range. In FIG. 16B the third lines L1031, L1032, L1033, L1034 . . . have the same operation stroke range as that of the fine control area line L1031. Therefore the operation stroke range over which fine control operation is possible is wide compared with the relationship L2 shown in FIG. 16A. In this way the fine control operation can be carried out over a wide range over the whole operation stroke range. In FIG. 16B the arrows G1, G2, and G3 indicate the directions for which change is possible for the first line, the second line, and the third lines respectively.

In comparison with a hydraulic operation lever device, in a system with an electrical operation lever device 21 the responsiveness of the change in turning radius when the operation stroke is greatly changed is good. This good responsiveness can apply a shock to the operator or the vehicle body 9. This is explained using FIGS. 17A and 17B. FIG. 17A shows the time variation when the operation stroke of the travel operation lever 21a is changed greatly from the center position, and FIG. 17B is the change in crawler track speed on the inner side of the turn (inner side vehicle speed) corresponding to FIG. 17A, for the comparison example for contrast with the present embodiment.

When the operation stroke of the travel operation lever 21a is greatly and suddenly changed from the center position (FIG. 17A), the inner side vehicle speed suddenly changes accordingly without much time delay (FIG. 17B). This applies a shock to the operator and the vehicle body 9 as well as damages the operability.

Therefore when the operation stroke is greatly changed, instead of generating and outputting the control electrical signal (for example the swash plate tilt position signal for the hydraulic pumps 3, 4) corresponding to the (target) speed ratio $y(t+\Delta t)$ calculated as described above, a control electrical signal to gradually attain the target speed ratio with a time delay may be generated and output and controlled so that the target speed ratio is reached after a time delay.

FIG. 17C shows the time variation of the inner side vehicle speed when the control electrical signal modulated with a first-order time delay is generated and output, so that the target speed ratio is reached gradually in accordance with a predetermined time constant.

In this way, according to the present embodiment, when the operation stroke of the travel operation lever 21a is greatly and suddenly changed from the center position (FIG. 17A), the corresponding inner side vehicle speed changes gently and reaches the target vehicle speed (FIG. 17C) with a time delay of $\Delta t1$ relative to the comparison example (FIG. 17B). Therefore when the turning radius of the work vehicle 1 is greatly changed, the turning radius changes smoothly in response to a sudden operation of the travel operation lever 21a, without giving a shock to the operator or the vehicle body 9. Also, the operability of the turning operation is improved.

However, if a small operation is applied to the travel operation lever 21a (FIG. 17D), and if the speed ratio is changed in the same way with the same time constant, the inner side vehicle speed will reach the target vehicle speed with a large time delay, the same as when the operation stroke is greatly changed (FIG. 17E; comparison example). Therefore the controllability is damaged when the operator wants to rapidly make fine adjustments to the desired turning radius by making small movements of the operation lever.

Therefore, when the operation stroke is changed by a small amount, the control to apply the first-order time delay modulation to the control electrical signal may be turned off, and the control electrical signal (for example the swash plate tilt position signal of the left and the right hydraulic pumps 3, 4) corresponding to the calculated (target) speed ratio $y(t+\Delta t)$ may be generated and output as described above (FIG. 17F).

In this way, according to the present embodiment, when the travel operation lever 21a is changed by a small stroke from the center position (FIG. 17D), the corresponding inner side vehicle speed reaches the target vehicle speed faster (FIG. 17F) than the comparison example (FIG. 17E) by $\Delta t2$. Therefore the controllability is improved when the operator wants to rapidly make fine adjustments to the desired turning radius by making small movements of the operation lever.

Also, when the operation stroke is changed by a small amount, instead of turning off the control that applies the first-order time delay modulation to the control electrical signal, control can be carried out to apply a modulation with a different time constant, so that the time delay will be smaller than the case where the operation stroke is greatly changed (FIG. 17G).

In this case also, when the travel operation lever 21a is changed by a small stroke from the center position (FIG. 17D), the corresponding inner side vehicle speed reaches the target vehicle speed faster (FIG. 17G) than the comparison example (FIG. 17E), so the controllability is improved when the operator wants to rapidly make fine adjustments to the desired turning radius by making small movements of the operation lever.

Also, it is possible to vary the time constant according to the magnitude of the target vehicle speed (target speed ratio). For example, when the target vehicle speed (target speed ratio) is large, the time constant is set so that the time delay becomes longer, and when the target vehicle speed (target speed ratio) is small, the time constant is set so that the time delay becomes shorter.

The following is an explanation of the case where the embodiment explained in FIGS. 17A through 17G is applied to the relationship L1 shown in FIG. 3 (FIG. 15).

In FIG. 3 (FIG. 15), the lines on which the operation stroke of the travel operation lever 21a can be greatly moved are the first line L11 and the second line L21. Conversely, in FIG. 3 (FIG. 15), the lines on which the operation stroke of the travel operation lever 21a can be moved by a small amount are the third line L131 including the fine control area line L131, and the second lines L132, L133, L134.

Therefore if the (target) speed ratio $y(t+\Delta t)$ is calculated to be a coordinate position on the first line L11 or second line L21, a control electrical signal to which the first-order time delay modulation is applied is generated and output, as shown in FIG. 17C, and if the (target) speed ratio $y(t+\Delta t)$ is calculated to be a coordinate position on the third line L131 including the fine control area line L131, and the second lines L132, L133, L134, either the control that applies the first-order time delay modulation is turned off, as shown in FIG. 17F, or a control electrical signal in which the time constant is varied to make the time delay small is generated and output, as shown in FIG. 17G. As a result, when for example the travel operation lever 21a is greatly and suddenly reclined, the inner side vehicle speed changes gently to reach the target vehicle speed with a time delay (FIG. 17C), and when for example the travel operation lever 21a is switched from the reclining operation to the return operation with small operation strokes, the inner side vehicle speed rapidly reaches the target vehicle speed (FIGS. 17F, 17G). In this way, when the operation to greatly change the turning radius is carried out, the shock applied to the operator or the vehicle body is reduced, so the operability is improved, as well as the controllability is improved when the turning radius is finely adjusted.

The case where the embodiment explained in FIGS. 17A through 17G is applied to the relationship L2 shown in FIGS. 16A and 16B is similar.

In the explanation above, a work vehicle 1 provided with left and right crawler tracks 10L, 10R has been assumed, but naturally the present invention may be applied to a wheeled work vehicle provided with wheels on the left and the right instead of the left and the right crawler tracks 10L, 10R.

Also, an operation lever 21 has been assumed in the explanations, but the present invention can be applied in the case where instead of an operation lever device an operation pedal or another arbitrary operation device is used. In other words, the present invention may be applied to an operation device having an operation stroke range with a predetermined range.

Also, in the above explanations, the case where the control quantity is the speed ratio was explained, but the present invention may be applied to controlled quantities other than speed ratio in the same way.

An embodiment in which a control quantity other than the speed ratio is controlled is explained using FIGS. 18A through 21B.

FIGS. 18A and 18B shows an embodiment in which the operation device is a brake pedal 70, and the control quantity is a brake command signal (pump capacity).

FIG. 18A shows a system that applies brakes to left and right crawler tracks 10L, 10R, using HST as in FIG. 2. Elements of the configuration that are the same as in FIG. 2 are given the same reference numerals, and duplicated explanations are omitted.

When the brake pedal 70 is operated, a measurement signal indicating the operation stroke of the brake pedal 70 is input to a controller 220. The controller 220 calculates the brake command signal (pump capacity) in accordance with the relationship L3 shown in FIG. 18B, and outputs the brake command signal to the swash plate drive units 5, 6 of the left and the right hydraulic pumps 3, 4.

FIG. 18B shows the relationship L3 between the operation stroke of the brake pedal 70 and the brake command signal (pump capacity). When the operation stroke of the brake pedal 70 increases, the capacity of the left and the right hydraulic pumps 3, 4 decreases, which decreases the rate of rotation of the left and the right hydraulic motors 7, 8, which slows the rotation of the left and the right crawler tracks 10L, 10R, and increases the braking force. Conversely, when the operation stroke of the brake pedal 70 decreases, the capacity of the left and the right hydraulic pumps 3, 4 increases, which increases the rate of rotation of the left and the right hydraulic motors 7, 8, which increases the rotation of the left and the right crawler tracks 10L, 10R, and releases the braking force.

In FIG. 18B, the second line L32 is set to the same slope as the first line L31, and the third lines L331, L332, L333, L334 . . . have a slope that is smaller than that of the first line L31 and the second line L32 and are set to the same operation stroke range, as explained in FIG. 16B. In FIG. 18B the operation stroke range of the third lines L331, L332, L333, L334 . . . is the same as that of the fine control area line L331. Therefore for the whole operation stroke range the fine control operation can be carried out over a wide range.

FIGS. 19A and 19B show an embodiment with a brake pedal 70 as the operation device, and the brake command signal (brake release pressure) as the control quantity.

FIG. 19A shows a system that applies brakes to left and right crawler tracks 10L, 10R by controlling the pressure (brake release pressure) of hydraulic oil transmitted to a brake device 72 by a brake pressure control valve 71.

When the brake pedal 70 is operated, a measurement signal indicating the operation stroke of the brake pedal 70 is input to a controller 320. The controller 320 calculates the brake command signal (brake release pressure) in accordance with the relationship L4 shown in FIG. 19B, and outputs the brake command signal to an electromagnetic solenoid on the brake pressure control valve 71.

FIG. 19B shows the relationship L4 between the operation stroke of the brake pedal 70 and the brake command signal (brake release pressure). When the operation stroke of the brake pedal 70 increases, the brake release pressure of the brake device 72 decreases, and the braking force increases. Conversely, when the operation stroke of the brake pedal 70 decreases, the brake release pressure of the brake device 72 increases, which reduces the braking force.

In FIG. 19B, as was explained for FIG. 16B, the second line L42 is set to the same slope as the first line L41, and the third lines L431, L432, L433, L434 . . . have a slope that is smaller than that of the first line L41 and the second line L42 and are set to the same operation stroke range. In FIG. 19B the operation stroke range of the third lines L431, L432, L433, L434 . . . is the same as that of the fine control area line L431. Therefore for the whole operation stroke range the fine control operation can be carried out over a wide range.

FIGS. 20A through 20C show an embodiment for which the operation device is a deceleration pedal 73 or an acceleration pedal 74, and the control quantity is the engine target rate of rotation.

FIG. 20A shows a system that controls the target rate of rotation of an engine 2 in accordance with the operation of the deceleration pedal 73 or the acceleration pedal 74.

When the deceleration pedal 73 is operated, a measurement signal indicating the operation stroke of the deceleration pedal 73 is input to a controller 420. The controller 420 calculates the engine target rate of rotation in accordance with the relationship L5 shown in FIG. 20B, and outputs it to the governor of the engine 2.

FIG. 20B shows the relationship L5 between the operation stroke of the deceleration pedal 73 and the engine target rate of rotation. When the operation stroke of the deceleration pedal 73 is increased, the engine target rate of rotation is decreased from the high idle rate of rotation to the low idle rate of rotation. Conversely, when the operation stroke of the deceleration pedal 73 is decreased, the engine target rate of rotation is increased from the low idle rate of rotation to the high idle rate of rotation.

In FIG. 20B, as was explained for FIG. 16B, the second line L52 is set to the same slope as the first line L51, and the third lines L531, L532, L533, L534 . . . have a slope that is smaller than that of the first line L51 and the second line L52 and are set to the same operation stroke range. In FIG. 20B the operation stroke range of the third lines L531, L532, L533, L534 . . . is the same as that of the fine control area line L531. Therefore the fine control operation can be carried out over a wide range for the whole operation stroke range.

The same applies in the case that an acceleration pedal 74 is used instead of a deceleration pedal 73.

In other words, when the acceleration pedal 74 is operated, a measurement signal indicating the operation stroke of the acceleration pedal 74 is input to a controller 420. The controller 420 calculates the engine target rate of rotation in accordance with the relationship L6 shown in FIG. 20C, and outputs it to the governor of the engine 2.

FIG. 20C shows the relationship L6 between the operation stroke of the acceleration pedal 74 and the engine target rate of rotation. When the operation stroke of the acceleration pedal 74 is increased, the engine target rate of rotation is increased. Conversely, when the operation stroke of the acceleration pedal 74 is decreased, the engine target rate of rotation is decreased.

In FIG. 20C, as was explained for FIG. 16B, the second line L62 is set to the same slope as the first line L61, and the third lines L631, L632, L633, L634 . . . have a slope that is smaller than that of the first line L61 and the second line L62 and are set to the same operation stroke range. In FIG. 20C the operation stroke range of the third lines L631, L632, L633, L634 . . . is the same as that of the fine control area line L631. Therefore for the whole operation stroke range the fine control operation can be carried out over a wide range.

FIGS. 21A and 21B show an embodiment in which the operation device is an operation lever 75 for a work tool, and the control quantity is the aperture area (work tool speed) of a control valve.

FIG. 21A shows a system that controls the actuation speed of a work tool not shown in the drawings, by changing the aperture area of a work tool control valve 76, thereby changing the flow rate of hydraulic oil supplied to a hydraulic cylinder 77 for the work tool, thereby changing the actuation speed of the hydraulic cylinder 77 of the work tool, thereby controlling the actuation speed of the work tool connected to the hydraulic cylinder 77.

When the operation lever 75 of the work tool is operated, a measurement signal indicating the operation stroke of the operation lever 75 of the work tool is input to a controller 520. The controller 520 calculates the aperture area (work tool speed) of the work tool control valve 76 in accordance with the relationship L7 shown in FIG. 21B, and outputs it to an electromagnetic solenoid on the work tool control valve 76.

FIG. 21B shows the relationship L7 between the operation stroke of the operation lever 75 of the work tool and the aperture area (work tool speed) of the work tool control valve 76. When the operation stroke of the operation lever 75 of the work tool is increased, the aperture area of the work tool control valve 76 increases, and the work tool speed increases. Conversely, when the operation stroke of the operation lever 75 of the work tool is decreased, the aperture area of the work tool control valve 76 decreases, and the work tool speed decreases.

In FIG. 21B, as was explained for FIG. 16B, the second line L72 is set to the same slope as the first line L71, and the third lines L731, L732, L733, L734 . . . have a slope that is smaller than that of the first line L71 and the second line L72 and are set to the same operation stroke range. In FIG. 21B the operation stroke range of the third lines L731, L732, L733, L734 . . . is the same as that of the fine control area line L731. Therefore for the whole operation stroke range the fine control operation can be carried out over a wide range.

INDUSTRIAL APPLICABILITY

The present invention can be applied not only to work vehicles including construction machinery such as bulldozers, hydraulic shovels, wheeled loaders, and forklifts, but also to vehicles in general including passenger and goods vehicles.

BRIEF DESCRIPTION OF THE DRAWINGS

FIG. 14 is a table showing the conditions for calculating the speed ratio;

FIGS. 17A through 17G are diagrams illustrating the time variations of the operation stroke or the time variations of the inner side vehicle speed;

Figure 1:
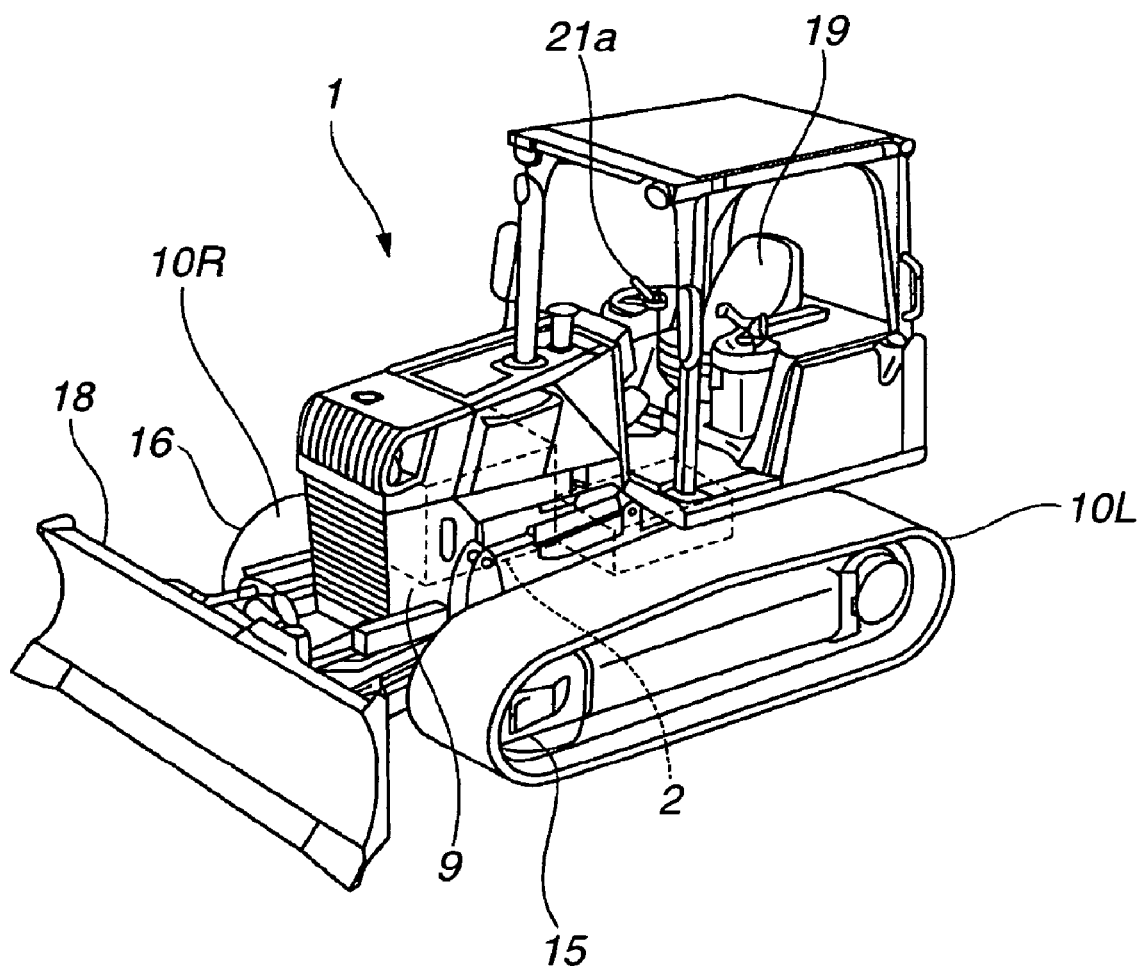
FIG. 1 is an isometric view of a work vehicle.
Figure 2:
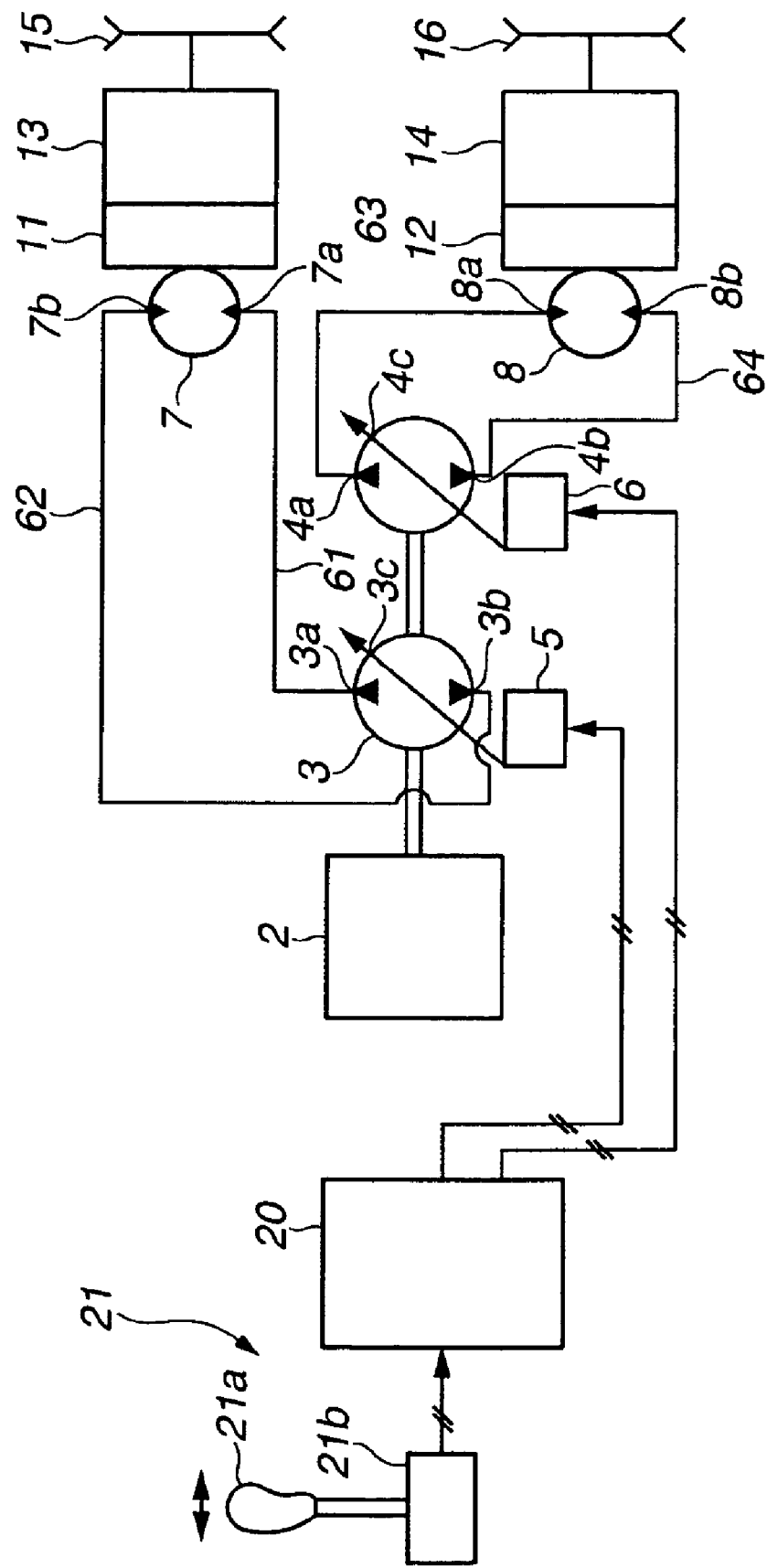
FIG. 2 is a system configuration diagram for a first embodiment.
Figure 3:
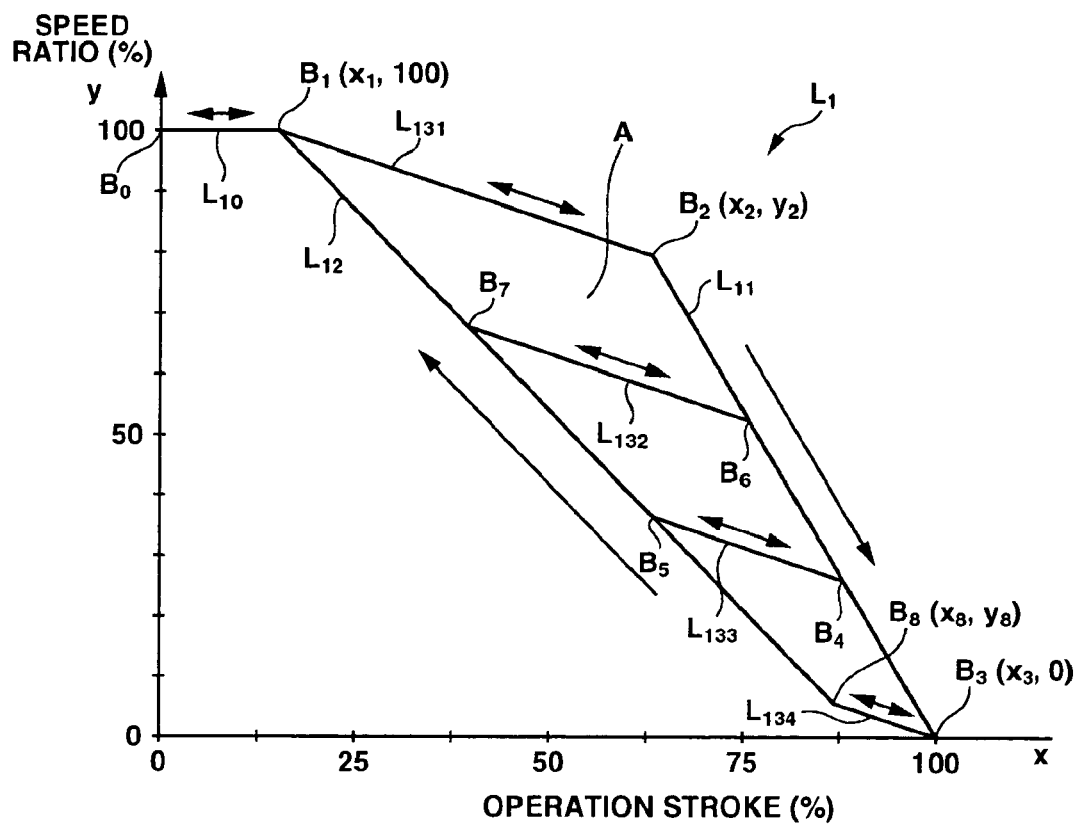
FIG. 3 is a diagram showing the relationship between the operation stroke and the speed ratio.
Figure 4:
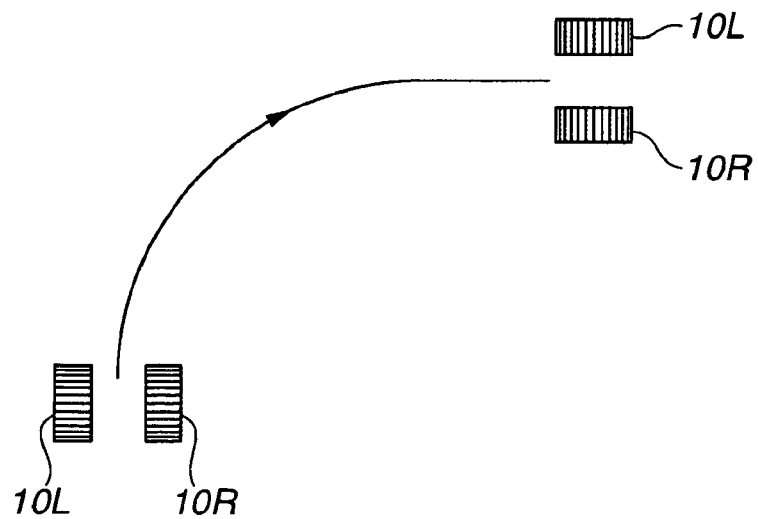
FIG. 4 is a diagram showing the tracks when a work vehicle according to the embodiment has turned.
Figure 5:
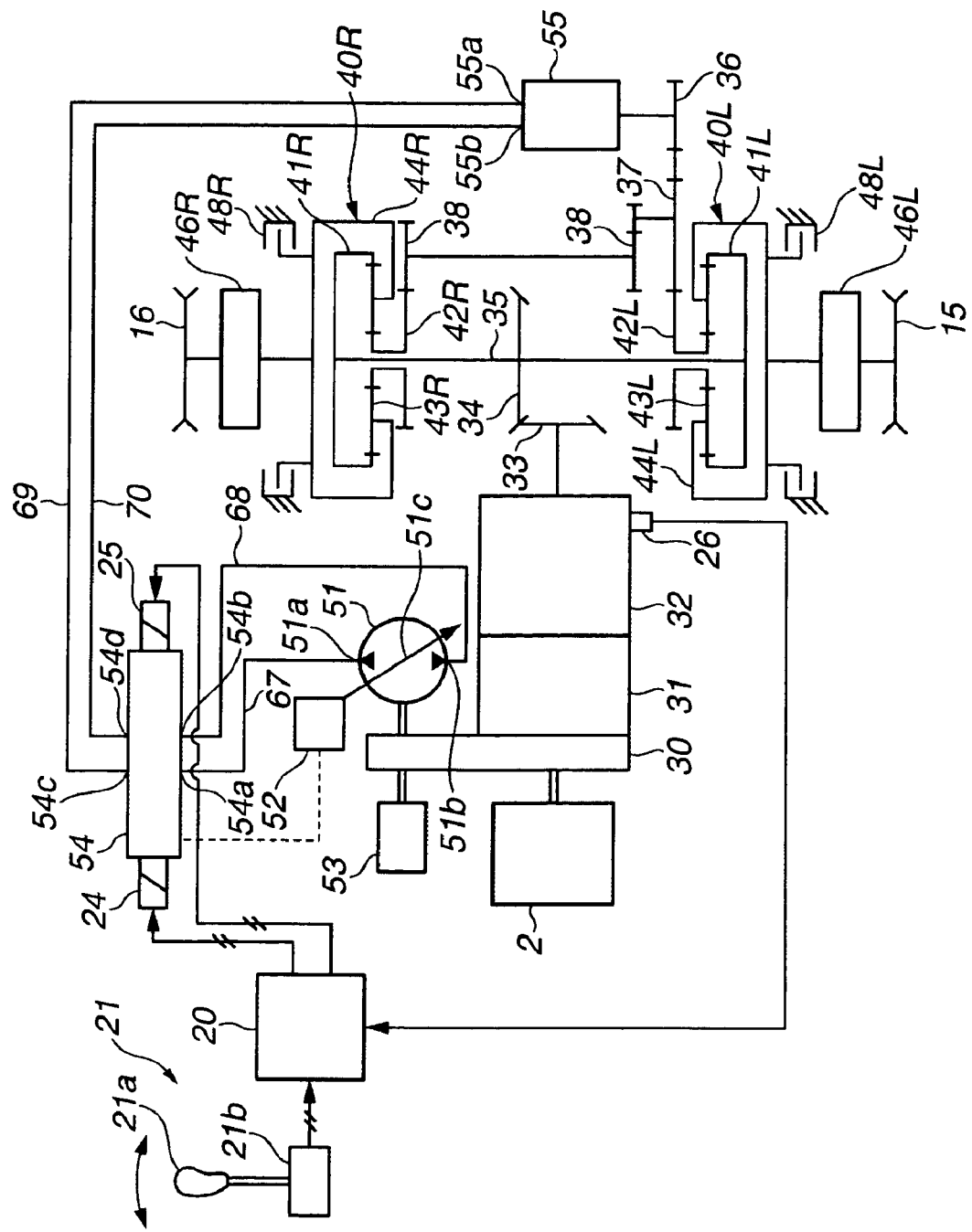
FIG. 5 is a system configuration diagram for a second embodiment.
Figure 6:
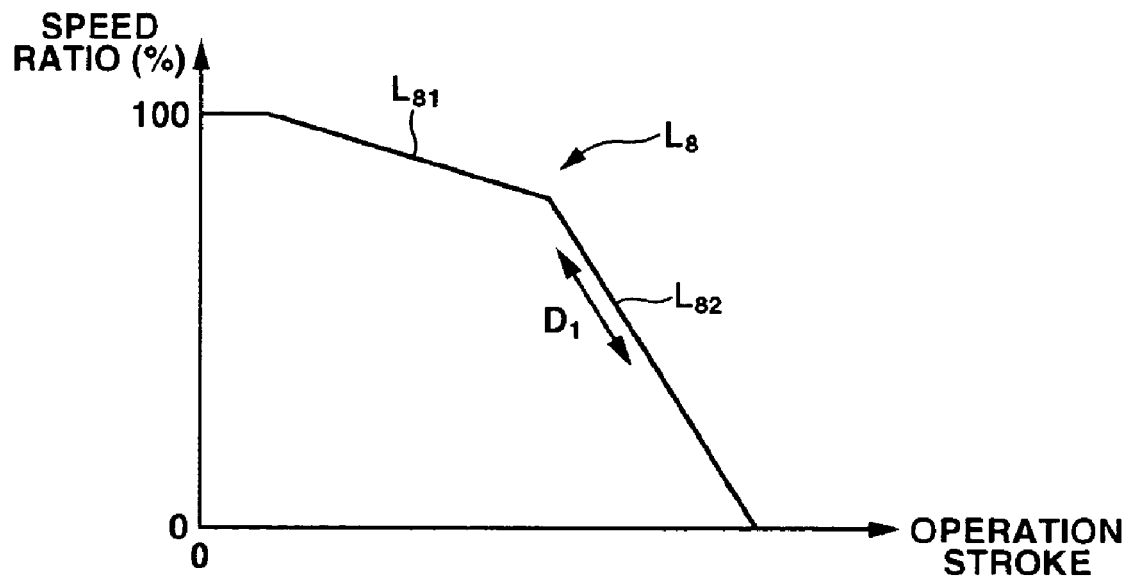
FIG. 6 is a diagram showing the conventional relationship between the operation stroke and the speed ratio.
Figure 7:
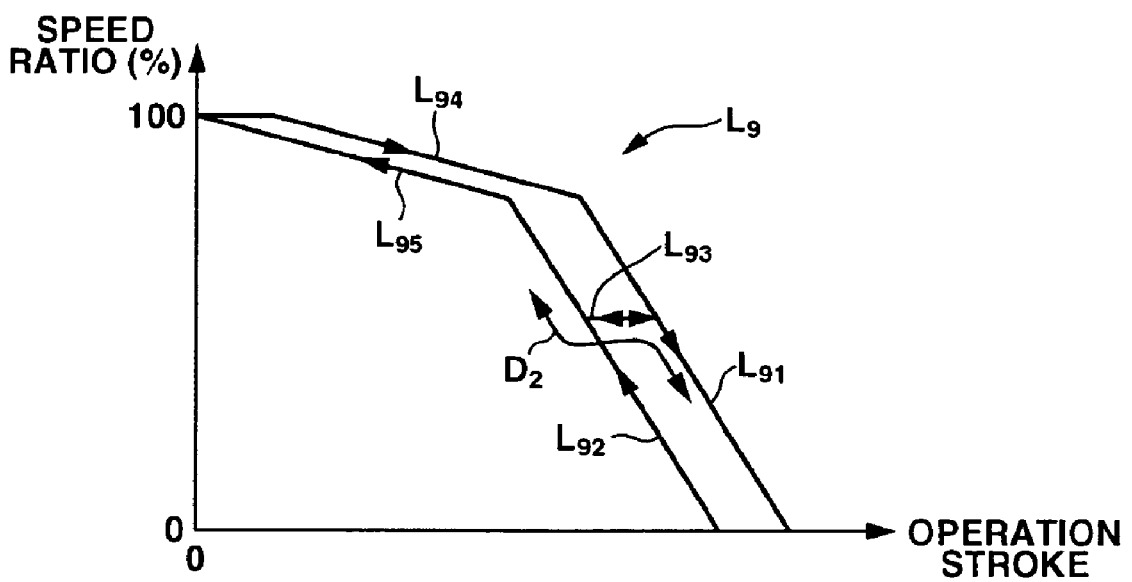
FIG. 7 is a diagram showing the conventional relationship between operation stroke and speed ratio.
Figure 8:
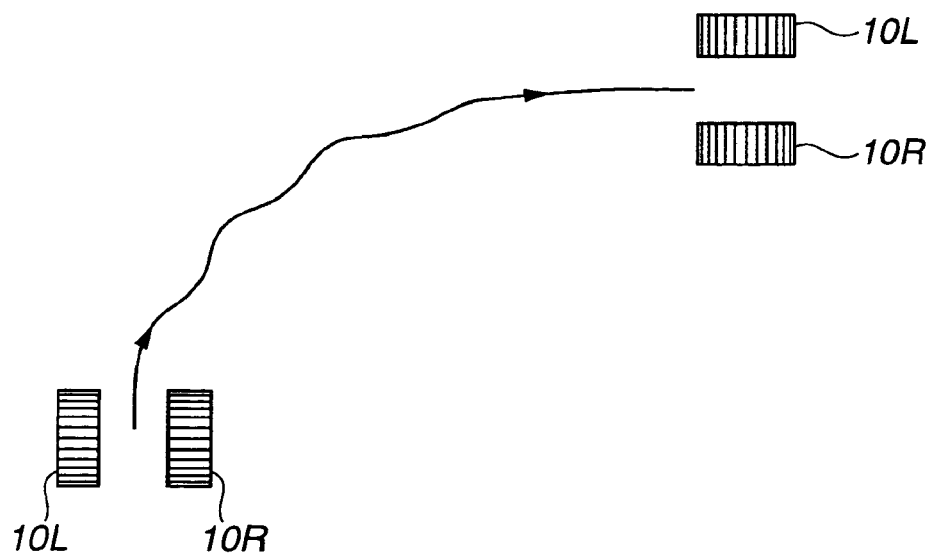
FIG. 8 is a diagram showing the tracks when a conventional work vehicle has turned.
Figure 9:
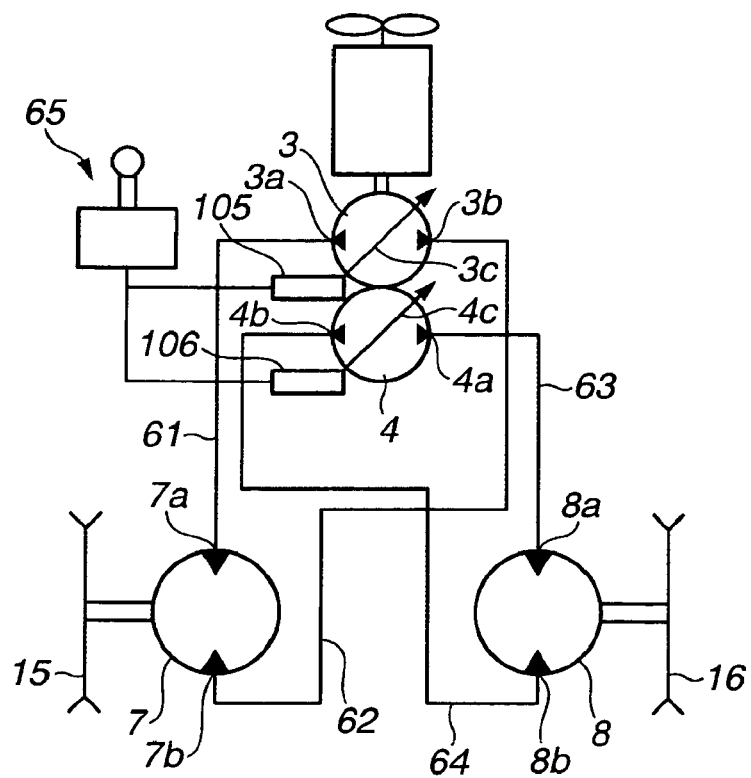
FIG. 9 is a configuration diagram for a system using a hydraulic operation lever device.
Figure 10:
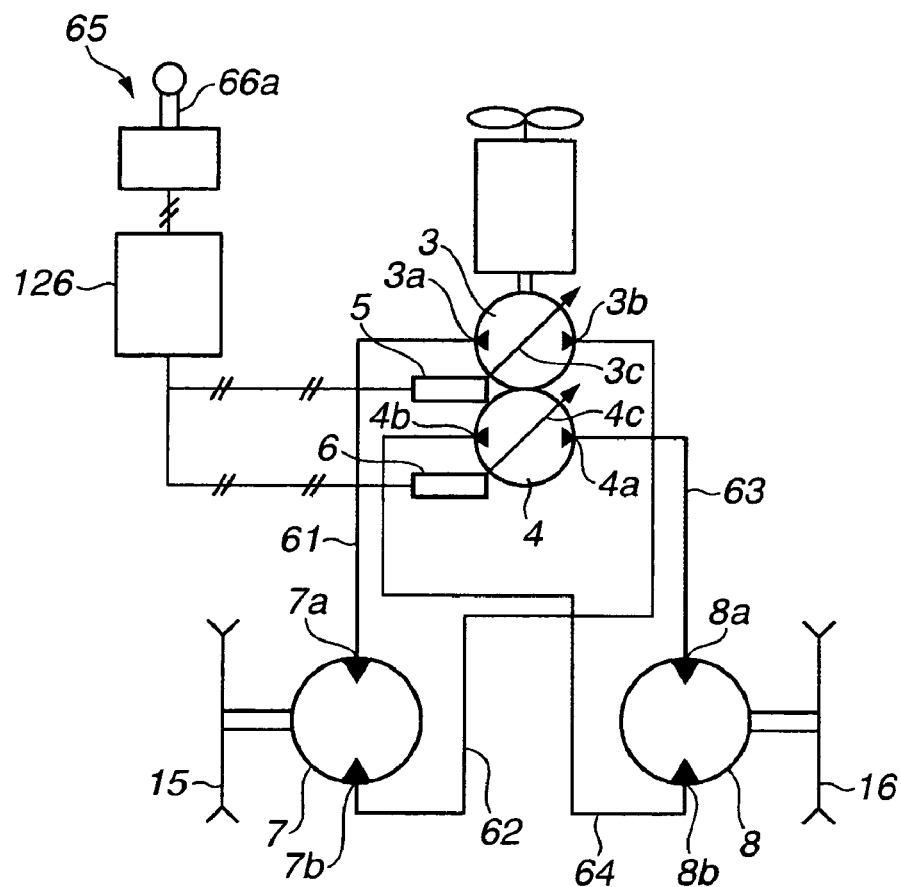
FIG. 10 is a configuration diagram for a system using an electrical operation lever device.
Figure 11:
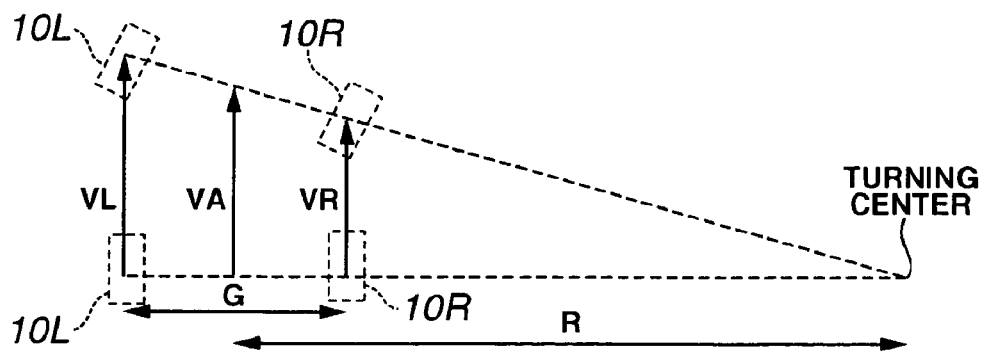
FIG. 11 is a diagram explaining the relationship between the speed of the left and the right crawler tracks and the turning radius.
Figure 12:
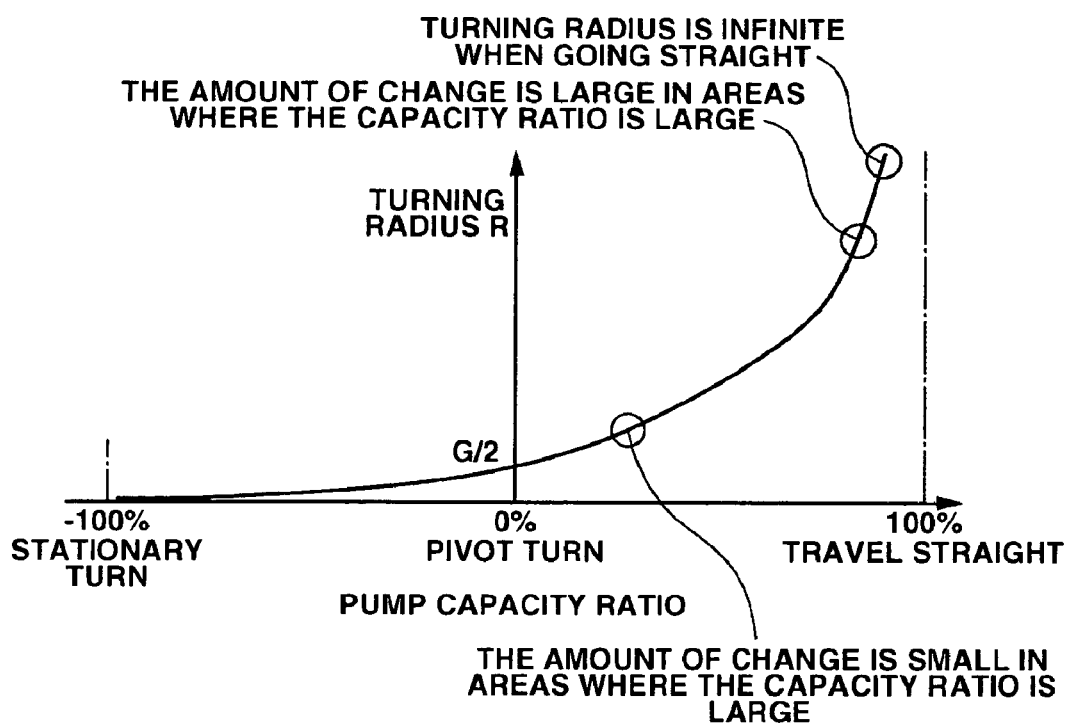
FIG. 12 is a diagram explaining the relationship between the pump capacity ratio and the turning radius.
Figure 13:
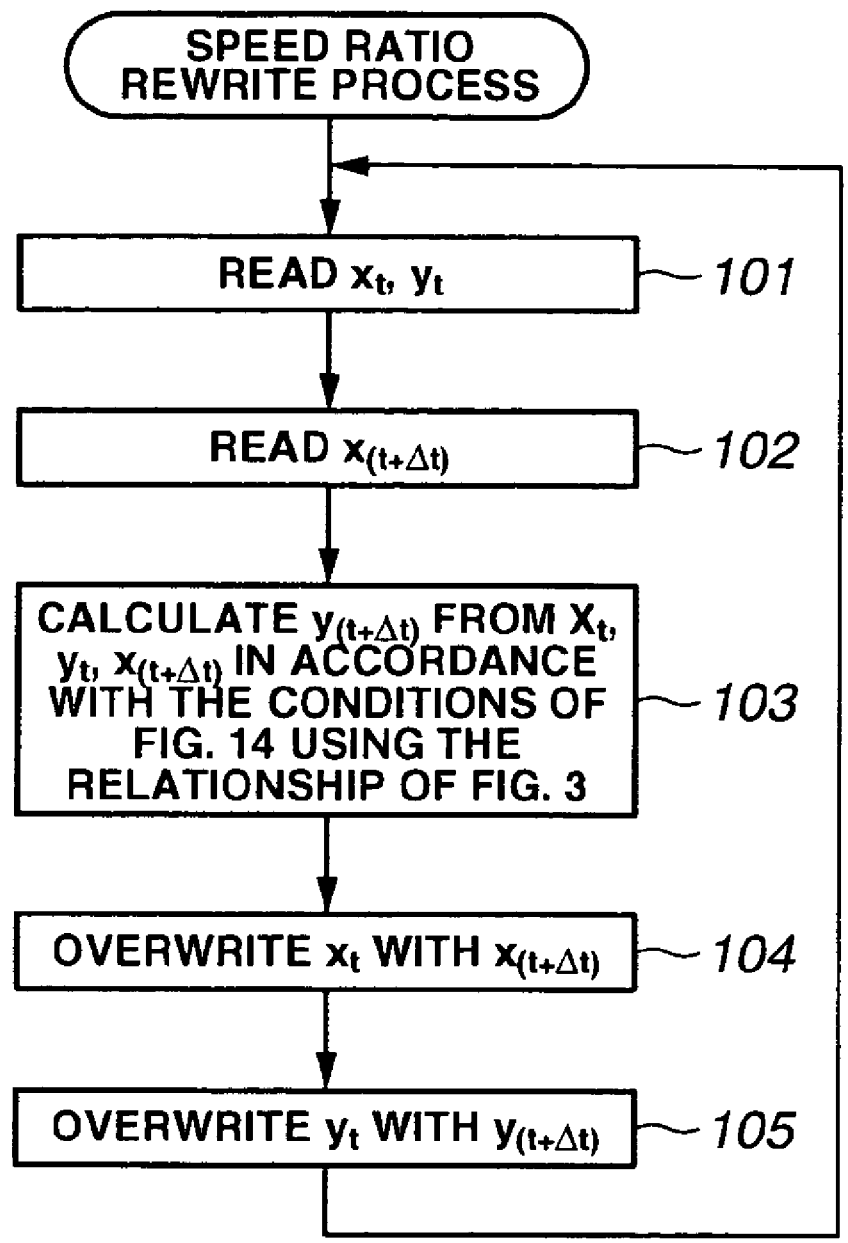
FIG. 13 is the flowchart of a travel control program installed and executed in the controller.
Figure 15:
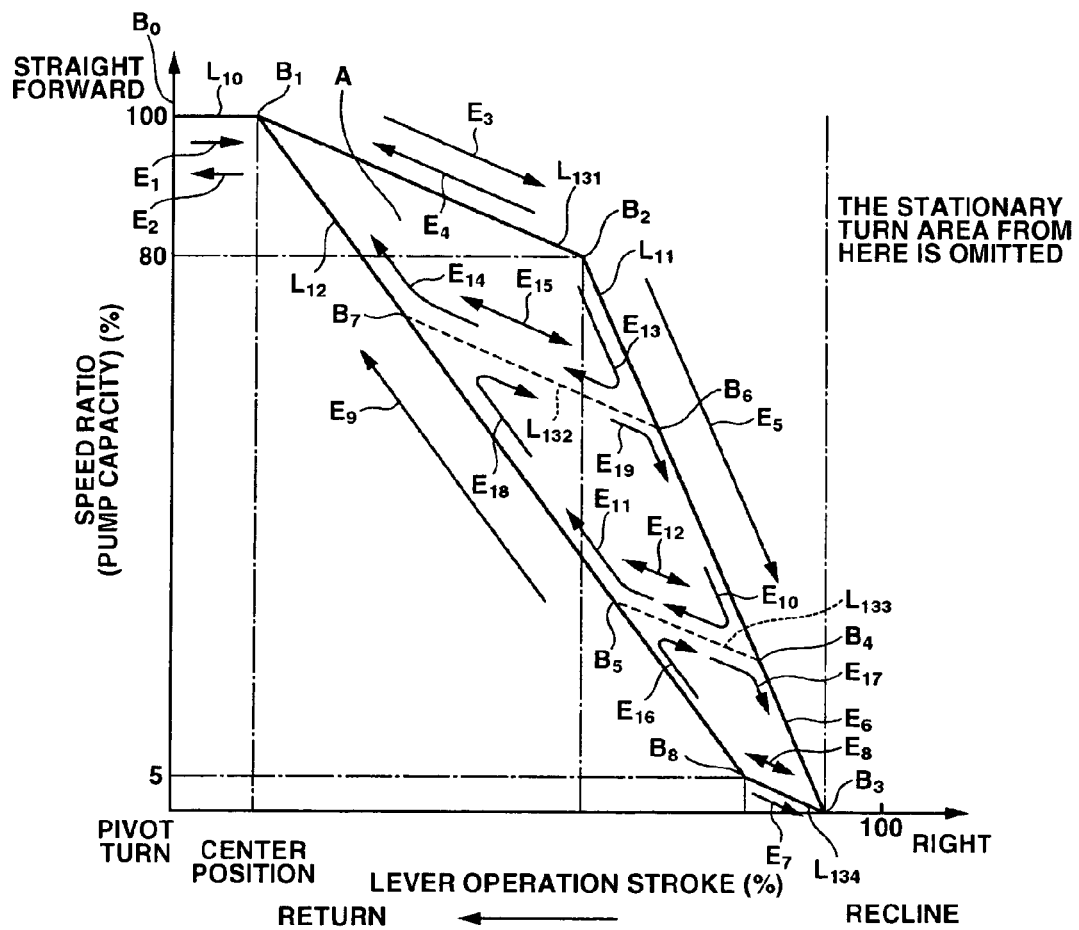
FIG. 15 is a diagram corresponding to FIG. 3 used for explaining the turning movements of the present embodiment.
Figure 16A:
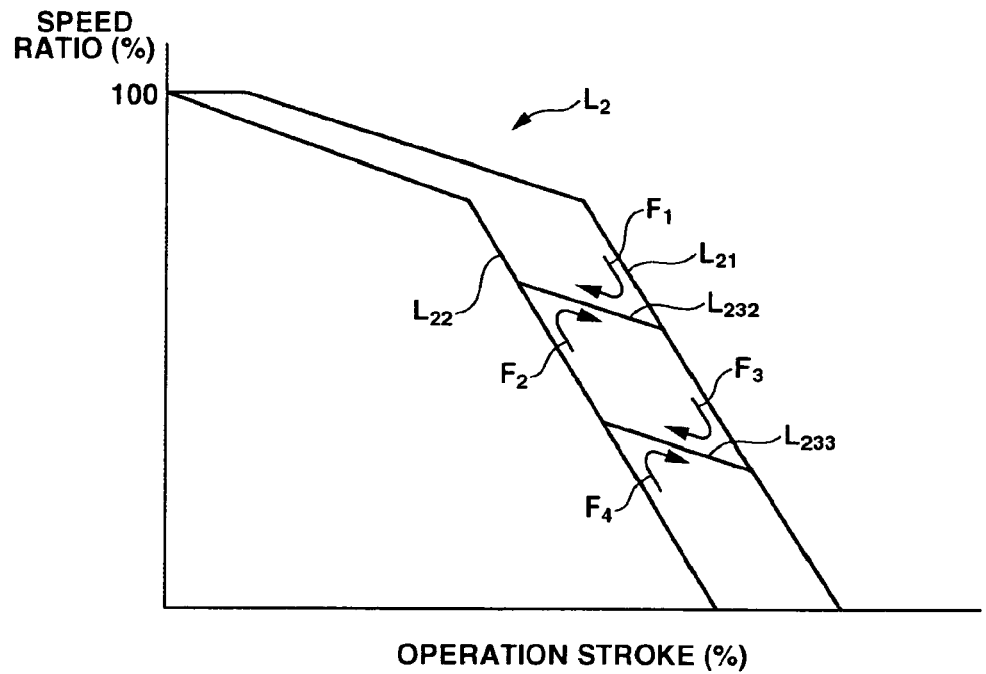
FIGS. 16A and 16B are diagrams illustrating relationships between operation stroke and speed ratio that are different from that of FIG. 3.
Figure 16B:
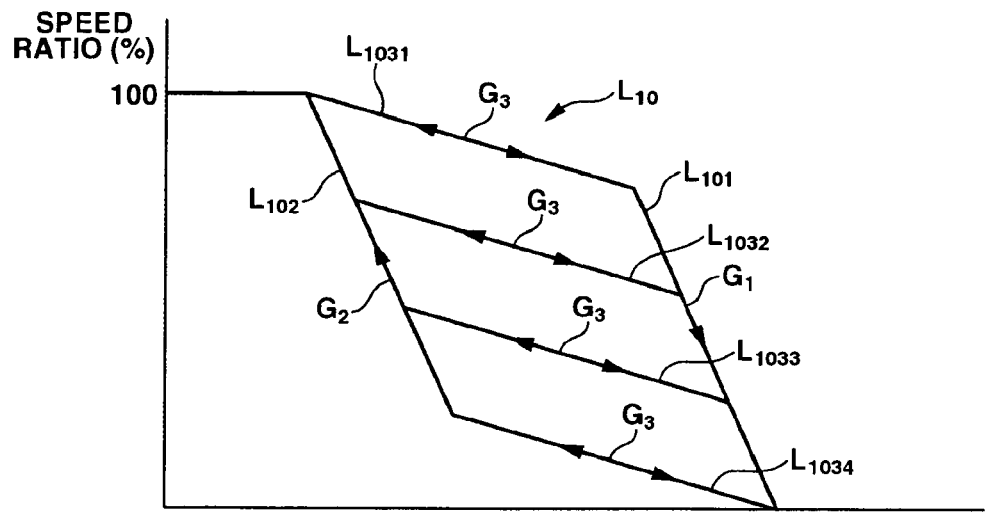
Figure 18A:
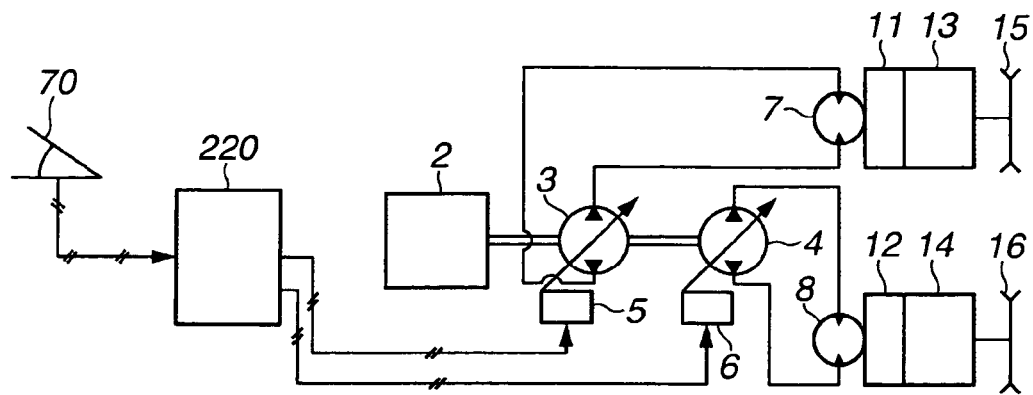
FIGS. 18A and 18B are diagrams explaining an embodiment in which the operation device is a brake pedal and the control quantity is the brake command signal (pump capacity)
Figure 18B:
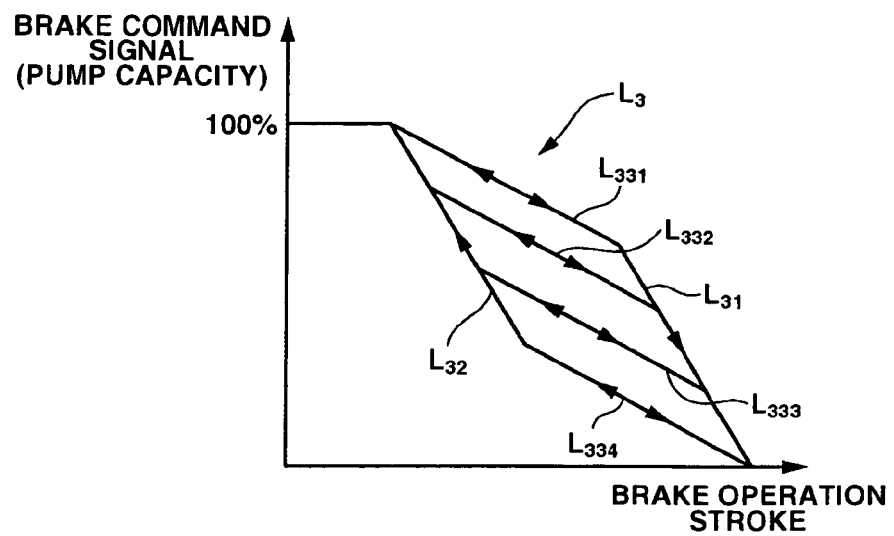
Figure 19A:
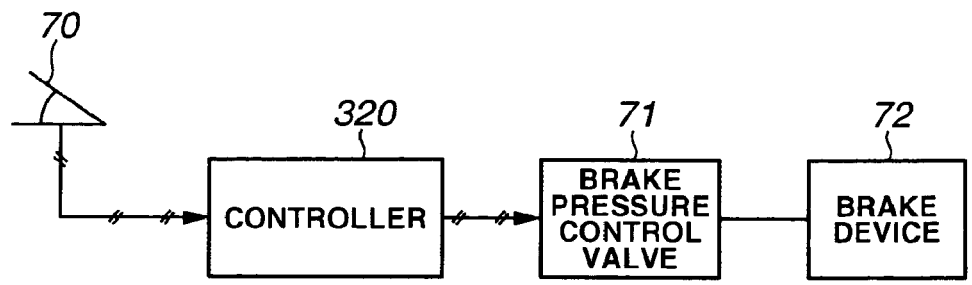
FIGS. 19A and 19B are diagrams explaining an embodiment in which the operation device is a brake pedal and the control quantity is the brake command signal (brake release pressure)
Figure 19B:
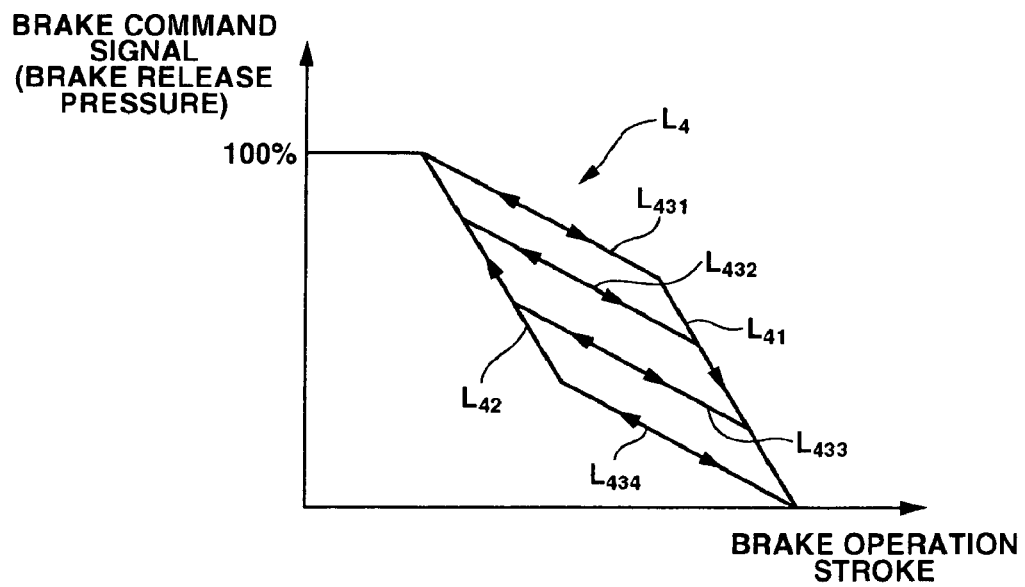
Figure 20A:
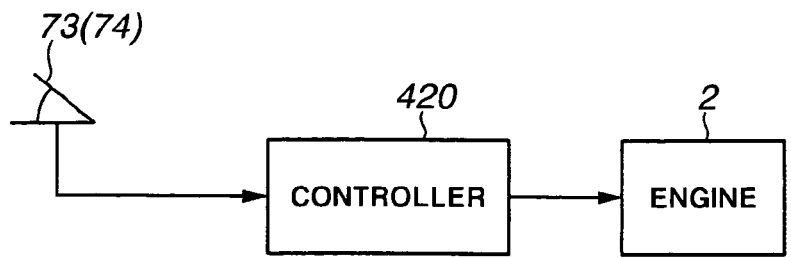
FIGS. 20A, 20B, and 20C are diagrams explaining an embodiment in which the operation device is a deceleration pedal or an acceleration pedal, and the control quantity is the engine target rate of rotation.
Figure 20B:
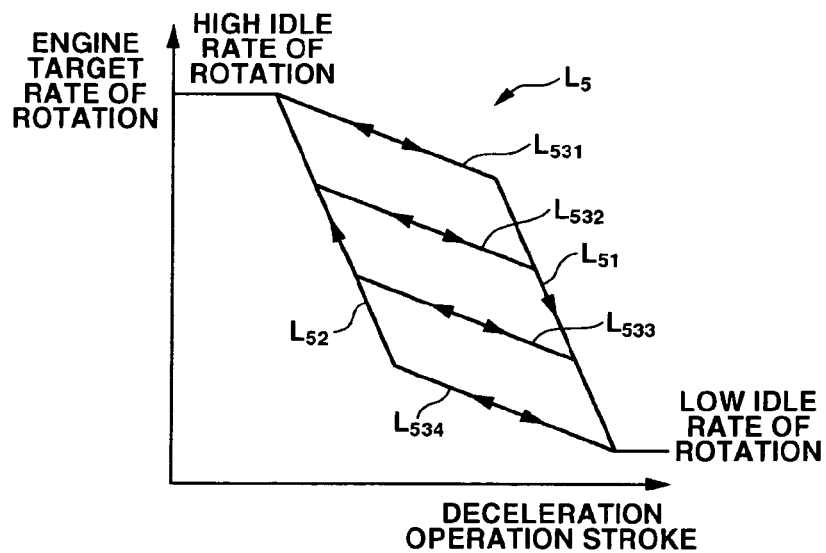
Figure 20C:
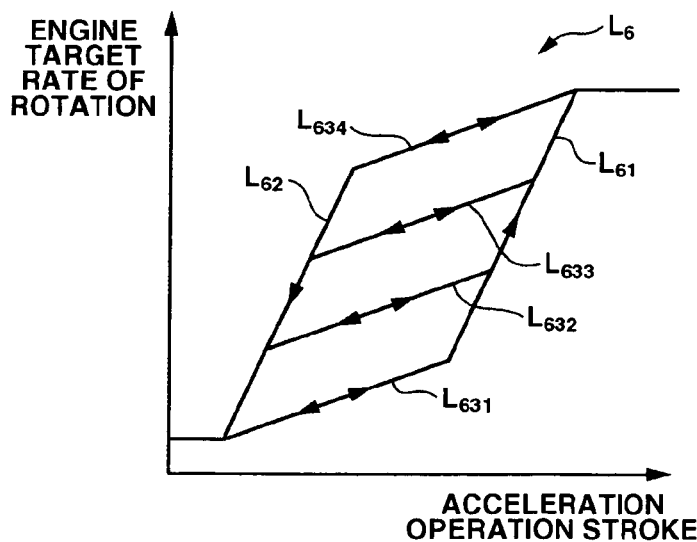
Figure 21A:
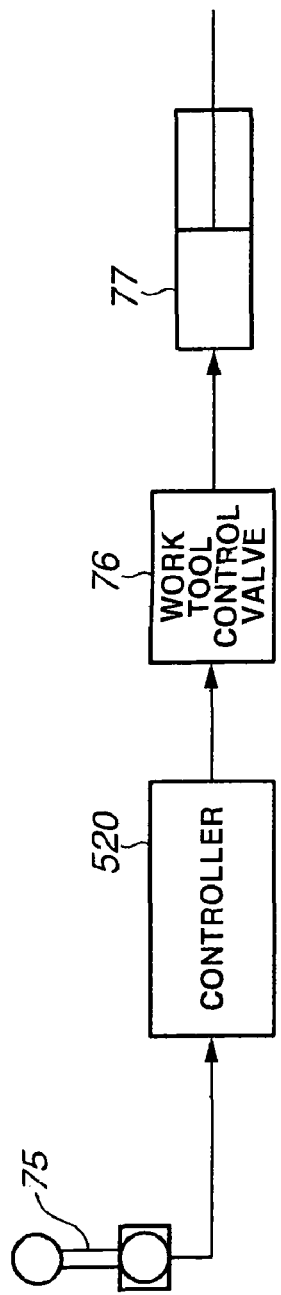
FIGS. 21A and 21B are diagrams explaining an embodiment in which the operation device is an operation lever for a work tool and the control quantity is the aperture area (work tool speed) of the control valve of the work tool.
Figure 21B:
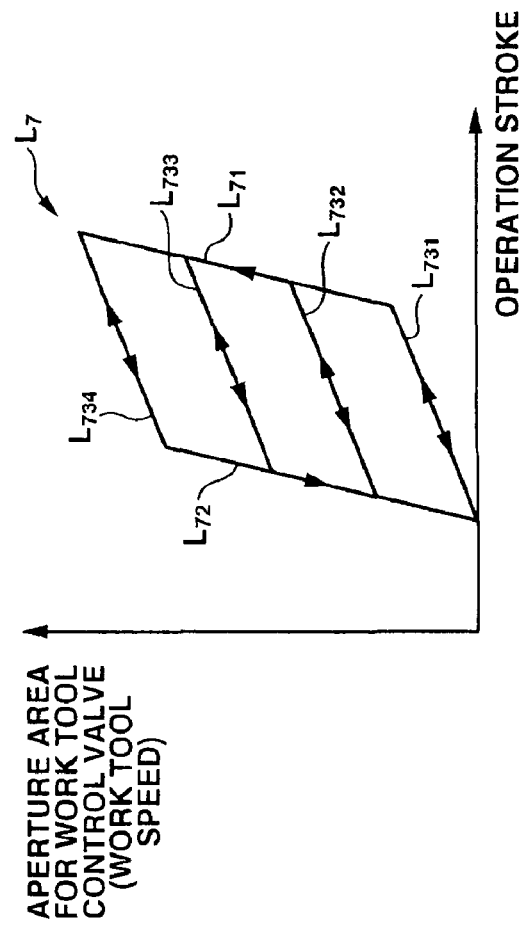

The invention claimed is:

1. A work vehicle travel control device that controls travel of a work vehicle in accordance with set lines indicating a relationship between an operation stroke of an operation device and a speed ratio of left and right crawler tracks or wheels of a vehicle body, wherein
a first line on which the speed ratio decreases corresponding to a change in the operation stroke,
a second line that has hysteresis with respect to the first line and on which the speed ratio increases corresponding to a change in the operation stroke, and
third lines on which the speed ratio changes corresponding to a change in the operation stroke and the change in the speed ratio with respect to the change in the operation stroke is smaller than that of the first line and that of the second line, are set, and
control means is provided for controlling the speed ratio to
decrease in accordance with the first line when the operation device is operated from a point on the first line in a direction that the speed ratio decreases,
to increase in accordance with the second line when the operation device is operated from a point on the second line in a direction that the speed ratio increases,
to change in accordance with the third lines when the operation device is operated from a point on the first line in a direction that the speed ratio increases, or when the operation device is operated from a point on the second line in a direction that the speed ratio decreases.

2. The work vehicle travel control device according to claim 1, wherein the second line is set so that the change in the speed ratio with respect to the change in the operation stroke is smaller than that of the first line, and the third lines are set so that the larger the speed ratio on a line the larger the range of the operation stroke.

3. The work vehicle travel control device according to claim 1, for controlling the speed ratio so that a target speed ratio is reached after a time delay from a time the operation device is operated, wherein the speed ratio is controlled so that the time delay when the speed ratio is controlled in accordance with the third lines is smaller than the time delay when the speed ratio is controlled in accordance with the first line or the second line.

4. The work vehicle travel control device according to claim 3, wherein drive shafts of hydraulic motors are connected to the left and the right crawler tracks or the wheels of the vehicle body, the operation device is an electrical operation device that outputs an electrical signal corresponding to the operation stroke, and a controller receives the outputted electrical signal from the operation device, and controls the speed ratio by changing a rate of rotation of the hydraulic motors in accordance with the operation stroke.

5. The work vehicle travel control device according to claim 1, wherein drive shafts of hydraulic motors are connected to the left and the right crawler tracks or the wheels of the vehicle body, the operation device is an electrical operation device that outputs an electrical signal corresponding to the operation stroke, and a controller receives the outputted electrical signal from the operation device, and controls the speed ratio by changing a rate of rotation of the hydraulic motors in accordance with the operation stroke.

6. A travel control program stored in a non-transitory readable storage medium, the travel control program for a work vehicle in which lines indicating a relationship between an operation stroke of an operation device and a speed ratio of left and right crawler tracks or wheels on a vehicle body are set as specified below, and comprising instructions which when executed in a travel control device of a work vehicle cause the work vehicle to operate as specified below:

1) a first line on which the speed ratio decreases corresponding to a change in the operation stroke, a second line that has hysteresis with respect to the first line and on which the speed ratio increases corresponding to a change in the operation stroke, and third lines on which the speed ratio changes corresponding to a change in the operation stroke and the change in the speed ratio with respect to the change in the operation stroke is smaller than that of the first line and that of the second line, are set, 2) when the operation device is operated from a point on the first line in a direction that the speed ratio decreases, the speed ratio is calculated in accordance with the first line, 3) when the operation device is operated from a point on the second line in a direction that the speed ratio increases, the speed ratio is calculated in accordance with the second line, 4) when the operation device is operated from a point on the first line in a direction that the speed ratio increases, or when the operation device is operated from a point on the second line in a direction that the speed ratio decreases, the speed ratio is calculated in accordance with the third lines.

7. The travel control program for the work vehicle according to claim 6, for generating a control electrical signal so that a calculated target speed ratio is reached with a time delay, wherein the control electrical signal is generated so that the time delay when the speed ratio is calculated in accordance with the third lines is smaller than the time delay when the seed ratio is calculated in accordance with the first line or the second line.

8. The work vehicle travel control program according to claim 6, wherein the second line is set so that the change in the speed ratio with respect to the change in the operation stroke is smaller than that of the first line, and the third lines are set so that the larger the speed ratio on a line the larger the range of the operation stroke.

9. A work vehicle travel control device that controls a control quantity of a work vehicle in accordance with set lines indicating a relationship between an operation quantity of an operation device and the control quantity, wherein a first line on which the control quantity changes corresponding to an increase in the operation quantity, a second line that has hysteresis with respect to the first line and on which the control quantity changes corresponding to a decrease in the operation quantity, and third lines on which the control quantity changes corresponding to a change in the operation quantity and the change in the control quantity corresponding to the change in the operation quantity is smaller than that of the first line and that of the second line, are set, and control means is provided for controlling the control quantity to change in accordance with the first line when the operation device is operated from a point on the first line in a direction that the operation quantity increases, to change in accordance with the second line when the operation device is operated from a point on the second line in a direction that the operation quantity decreases, to change in accordance with the third lines when the operation device is operated from a point on the first line in the direction that the operation quantity decreases, or when the operation device is operated from a point on the second line in the direction that the operation quantity increases.

10. A control program stored in a non-transitory readable storage medium, the control program for a work vehicle in which lines indicating a relationship between an operation quantity of an operation device and a control quantity are set as specified below, and comprising instructions which when executed in a control device of the work vehicle cause the work vehicle to operate as specified below:

1) a first line on which the control quantity changes corresponding to an increase in the operation quantity, a second line that has hysteresis with respect to the first line and on which the control quantity changes corresponding to a decrease in the operation quantity, and third lines on which the control quantity changes corresponding to a change in the operation quantity and the change in control quantity corresponding to the change in the operation quantity is smaller than that of the first line and that of the second line, are set, 2) when the operation device is operated in a direction that the operation quantity increases from a point on the first line, the control quantity is calculated in accordance with the first line,
3) when the operation device is operated in a direction that the operation quantity decreases from a point on the second line, the control quantity is calculated in accordance with the second line, and
4) when the operation device is operated in a direction that the control quantity decreases from a point on the first line, or when the operation device is operated in a direction that the control quantity increases from a point on the second line, the control quantity is calculated in accordance with the third lines.

* * * * *